(12) United States Patent
Simsek et al.

(10) Patent No.: US 9,594,608 B2
(45) Date of Patent: Mar. 14, 2017

(54) MESSAGE-BASED MODELING

(71) Applicant: The MathWorks, Inc., Natick, MA (US)

(72) Inventors: Hidayet Tunc Simsek, Newton, MA (US); Vijaya Raghavan, Brookline, MA (US); Ramamurthy Mani, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 14/335,159

(22) Filed: Jul. 18, 2014

(65) Prior Publication Data

US 2015/0020080 A1    Jan. 15, 2015

Related U.S. Application Data

(63) Continuation-in-part of application No. 14/163,147, filed on Jan. 24, 2014, now Pat. No. 9,304,840, which is a continuation of application No. 13/117,531, filed on May 27, 2011, now Pat. No. 8,689,236.

(60) Provisional application No. 61/349,401, filed on May 28, 2010.

(51) Int. Cl.
*G06F 9/54* (2006.01)

(52) U.S. Cl.
CPC ........ *G06F 9/546* (2013.01); *G06F 2209/548* (2013.01)

(58) Field of Classification Search
None
See application file for complete search history.

(56) References Cited

U.S. PATENT DOCUMENTS 5,317,746 A    5/1994  Watanabe
6,519,639 B1   2/2003  Glasser et al.
(Continued)

FOREIGN PATENT DOCUMENTS

GB    2006/003928    5/2007
GB    0521625.4      5/2007

OTHER PUBLICATIONS

"Simulink, Model-Based and System-Based Sesign", The MathWorks, 2004, pp. 1-488.*

(Continued)

*Primary Examiner* — Tuan Dao
(74) *Attorney, Agent, or Firm* — Cesari and McKenna, LLP; Michael R. Reinemann

(57) ABSTRACT

A system and method may generate executable models having message sending objects and message receiving objects. A message may include a fixed data payload, and the message may persist for only a determined time interval of a total execution or simulation time of model. Message queues may be established for the messages, and the queues may have attributes. The model may include a state-based portion having states and transitions. States may be configured to generate and send messages, and to receive and process messages. In addition, transitions may be guarded by particular messages. The system and method also may generate standalone code, such as source code, for the model. The standalone code may include code that establishes a message passing service to support the sending and receiving of messages.

31 Claims, 23 Drawing Sheets

(56) References Cited

U.S. PATENT DOCUMENTS

| | | | |
|---|---|---|---|
| 6,522,635 B1* | 2/2003 | Bedwell | H04B 7/18528 370/314 |
| 7,313,449 B1 | 12/2007 | Ciolfi et al. | |
| 7,324,931 B1 | 1/2008 | Warlock | |
| 7,941,299 B1 | 5/2011 | Aldrich et al. | |
| 7,991,598 B1 | 8/2011 | Wood | |
| 8,190,417 B2 | 5/2012 | Shachar | |
| 8,689,236 B2 | 4/2014 | Simsek et al. | |
| 2002/0013889 A1* | 1/2002 | Schuster et al. | 711/203 |
| 2004/0230979 A1* | 11/2004 | Beecroft et al. | 718/100 |
| 2005/0216248 A1 | 9/2005 | Ciolfi et al. | |
| 2007/0288885 A1 | 12/2007 | Brunel et al. | |
| 2008/0059739 A1 | 3/2008 | Ciolfi | |
| 2008/0098349 A1 | 4/2008 | Lin et al. | |
| 2009/0044171 A1* | 2/2009 | Avadhanula | 717/105 |
| 2009/0132936 A1 | 5/2009 | Anderson et al. | |
| 2009/0164558 A1* | 6/2009 | Hofmann | 709/203 |
| 2009/0177779 A1* | 7/2009 | DeVal et al. | 709/227 |
| 2009/0204949 A1 | 8/2009 | Howland et al. | |
| 2009/0240449 A1* | 9/2009 | Gibala | G01R 22/063 702/62 |
| 2009/0292518 A1 | 11/2009 | Shachar et al. | |
| 2010/0049821 A1 | 2/2010 | Oved | |
| 2010/0070753 A1 | 3/2010 | Kido et al. | |
| 2011/0106890 A1* | 5/2011 | Karpov | G06Q 10/107 709/206 |
| 2011/0296436 A1 | 12/2011 | Moore et al. | |

OTHER PUBLICATIONS

Bagrodia, Rajive I., et al., "A Message-Based Approach to Discrete-Event Simulation," IEEE, IEEE Transactions on Software Engineering, vol. SE-13, No. 6, Jun. 1987, pp. 654-665.

Bringmann, Eckard, "Automated Model-based testing of control software with TPT," 2008, pp. 1-19.

Bringmann, Eckard, "Model-based testing of Automotive Systems," International Conference on Software Testing, verification and validation (ICST), 2008, pp. 1-9.

Cleaveland, Rance, et al., "An Instrumentation-Based Approach to Controller Model Validation," Model-Driven Development of Reliable Automotive Services. Second Automotive Software Workshop, ASWSD 2006, Revised Selected Papers Springer-Verlag Berlin, 2008, pp. 1-14.

Heverhagen, Torsten, et al., "A Profile for Integrating Function Blocks into the Unifiled Modeling Language," http://www-verimag.imag.fr/EVENTS/2003/SVERTS/PAPERS-WEB/08-Heverhagen-FunctionBlockAdapters.pdf, Oct. 20, 2003, pp. 1-19.

Hoffmann, Ph.D., Hans-Peter, "SysML-Based Systems Engineering Using a Model-Driven Development Approach," Telelogic, An IBM Company, Version 1, Jul. 2008, pp. 1-16.

Hooman, Jozef, et al., "Coupling Simulink and UML Models," http://www.mbsd.cs.ru.nl/publications/papers/hooman/FORMS04.pdf, 2004, pp. 1-8.

Krahl, David, "Extendsim 7," IEEE, Proceedings of the 2008 Winter Simulation Conference, Winter 2008, pp. 215-221.

Krahl, David, et al., "A Message-Based Discrete Event Simulation Architecture," IEEE, Proceedings of the 1997 Winter Simulation Conference, Winter 1997, pp. 1361-1367.

McQuillan, John M., et al., "Some Considerations for a High Performance Message-Based Interprocess Communication System," Bolt Beranek and Newman, Inc., Jul. 1975, pp. 77-86.

"Notification of Transmittal of the International Search Report and the Written Opinion of the International Searching Authority, or the Declaration," International Filing Date: May 27, 2011, International Application No. PCT/US2011/000964, Applicant: The MathWorks, Inc., Date of Mailing: Aug. 25, 2011, pp. 1-12.

"Notification of Transmittal of the International Search Report and the Written Opinion of the International Searching Authority, or the Declaration," International Filing Date: May 27, 2011, International Application No. PCT/US2011/000967, Applicant: The MathWorks, Inc., Date of Mailing: Aug. 26, 2011, pp. 1-12.

"Public Health Information Network Messaging System (PHINMS)," 2009, pp. 1-50.

"Real-Time Workshop: For Use with Simulink-Getting Started," Version 6, The MathWorks, Inc., Jun. 2004, pp. i-iv, 1-1 to 120 and 2-1 to 2-30.

"Simulink® 7: User's Guide," The MathWorks, Inc., Sep. 2009, pp. i -xlvi, 1-1 to 1-46, 2-1 to 2-44, 3-1 to 3-34, 4-1 to 4-138, 5-1 to 5-30, 6-1 to 6-84, 7-1 to 7-60, 8-1 to 8-26, 9-1 to 9-60, 10-1 to 10-88, 11-1 to 11-30, 12-1 to 12-66, 13-1 to 13-58, 14-1 to 14-28, 15-1 to 15-36, 16-1 to 16-28, 17-1 to 17-46, 18-1 to 18-16, 19-1 to 19-68, 20-1 to 20-32, 21-1 to 21-32, 22-1 to 22-16, 23-1 to 23-10, 24-1 to 24-24, 25-1 to 25-12, 26-1 to 26-42, 27-1 to 27-36, 28-1 to 28-26, 29-1 to 29-46, 30-1 to 30-160, 31-1 to 31-32, Glossary-1 to Glossary-2, A-1 to A-4, Index-1 to Index-22.

"Simulink, Model-based and System-based Design", The MathWorks, 2004, pp. 1-488.

"Simulink® Verification and Validation 2: User's Guide," The MathWorks, Inc., Sep. 2007, pp. i-xii, 1-1 to 1-6, 2-1 to 2-58, 3-1 to 3-32, 4-1 to 4-28, 5-1 to 5-66, 6-1 to 6-30, 7-1 to 7-4, 8-1 to 8-56, 9-1 to 9-4, 10-1 to 10-42, A-1 to A-4, and Index-1 to Index-4.

Traub, Matthias, et al., "Generating Hardware Descriptions from Automotive Function Models for an FPGA-Based Body Controller: A Case Study," http://www.mathworks.com/automotive/macde2008/proceedings/day2/04_daimler_generting_hw_descriptions_with_hdl_coder_papers.pdf, 2008, pp. 1-8.

U.S. Appl. No. 13/117,531, filed May 27, 2011 by Hidayet Tunc Simsek et al. for Message-Based Modeling, pp. 1-62.

U.S. Appl. No. 14/163,147, filed Jan. 24, 2014 by Hidayet T. Simsek et al. for Message-Based Modeling, pp. 1-64.

"Creating and Managing Timing Diagrams", IBM, retrieved from www.ibm.com on Mar. 29, 2013, 5 pages.

"Creating Communication Diagrams", IBM, retrieved from www.ibm.com on Mar. 29, 2013, 12 pages.

"Creating Sequence Diagrams", IBM, retrieved from www.ibm.com on Mar. 29, 2013, 24 pages.

"UML Sequence Diagrams", uml-diagrams.org, retrieved from http://www.uml-diagrams.org/sequence-diagrams.html on Mar. 29, 2013, 18 pages.

Ciancarini, Paolo, "Exercises on Basic UML Behaviors," Nov. 2013, pp. 1-38.

Dumond, Yves, et al., "A Relationship Between Sequence and Statechart Diagrams," 2000, pp. 1-6.

Gronmo, Roy, et al., "From UML 2 Sequence Diagrams to State Machines by Graph Transformation," Journal of Object Technology, AITO-Association Internationale pour les Technologies Objets, JOT, vol. 10, Jun. 2011, pp. 1-22.

Harel, David, et al., "Synthesis Revisited: Generating Statechart Models from Scenario-Based Requirements," Formal Methods in Software and Systems Modeling, LNCS, vol. 3393, Springer-Verlag Berlin, Heidelberg, Jan. 13, 2005, pp. 1-18.

Latronico, Beth, et al., "Representing Embedded System Sequence Diagrams as a Formal Language," Electrical & Computer Engineering, Carnegie Mellon University, UML, Oct. 2001, pp. 1-23.

U.S. Appl. No. 13/117,859, filed May 27, 2011 by Alan J. Moore et al. for a Message-Based Model Verification, pp. 1-62.

Whittle, Jon, et al., "Generating Statechart Designs From Scenarios," Jun. 2000, pp. 1-10.

Behrmann, Gerd, et al., "A Tutorial on UPPAAL 4.0," Nov. 28, 2006, pp. 1-48.

Bobbio, Andrea, "System Modeling with Petri Nets," A. G. Colombo and A. Saiz de Bustamante (eds.), System Reliability Assessment, Kluwer p.c., 1990, pp. 1-44.

Campos-Rebelo, Rogerio, et al., "From IOPT Petri Nets to C: An Automatic Code Generator Tool," 2011 9th IEEE International Conference on Industrial Informatics, Caparica, Lisbon, IEEE, Jul. 26-29, 2011, pp. 390-395.

Murata, Tado, "Petri Nets: Properties, Analysis and applications," Proceedings of the IEEE, vol. 77, No. 4, IEEE, Apr. 1989, pp. 541-580.

(56) References Cited

OTHER PUBLICATIONS

Van Der Aalast, W. M. P., et al., "Analysis of Discrete-time Stochastic Petri Nets," Statistica Neerlandica, vol. 54, Issue 2, Blackwell Publishers, Ltd., Jul. 2000, pp. 1-17.
Leung, Man-Kit, "An Extensible and Retargetable Code Generation Framework for Actor Models," Electrical Engineering and Computer Sciences University of California at Berkeley, Dec. 19, 2009, pp. 1-82.
"Simulinke® : User's Guide: R2014a," The MathWorks, Inc., Mar. 2014, pp. 3632.

* cited by examiner

MESSAGE-BASED MODELING

CROSS-REFERENCE TO RELATED APPLICATIONS

This application is a continuation-in-part (CIP) application of application Ser. No. 14/163,147 filed Jan. 24, 2014 for MESSAGE-BASED MODELING, now U.S. Pat. No. 9,304,840, which is a continuation of application Ser. No. 13/117,531 filed May 27, 2011 for MESSAGE-BASED MODELING, now U.S. Pat. No. 8,689,236, which application claims the benefit of U.S. Provisional Patent Application Ser. No. 61/349,401, which was filed on May 28, 2010, by Alan Moore et al., for a MESSAGE BASED TRACES AND VERIFICATION, which applications are hereby incorporated by reference in their entireties.

BRIEF DESCRIPTION OF THE DRAWINGS

The disclosure below refers to the accompanying drawings, of which.

DETAILED DESCRIPTION OF ILLUSTRATIVE EMBODIMENTS

Overview

Figure 1:
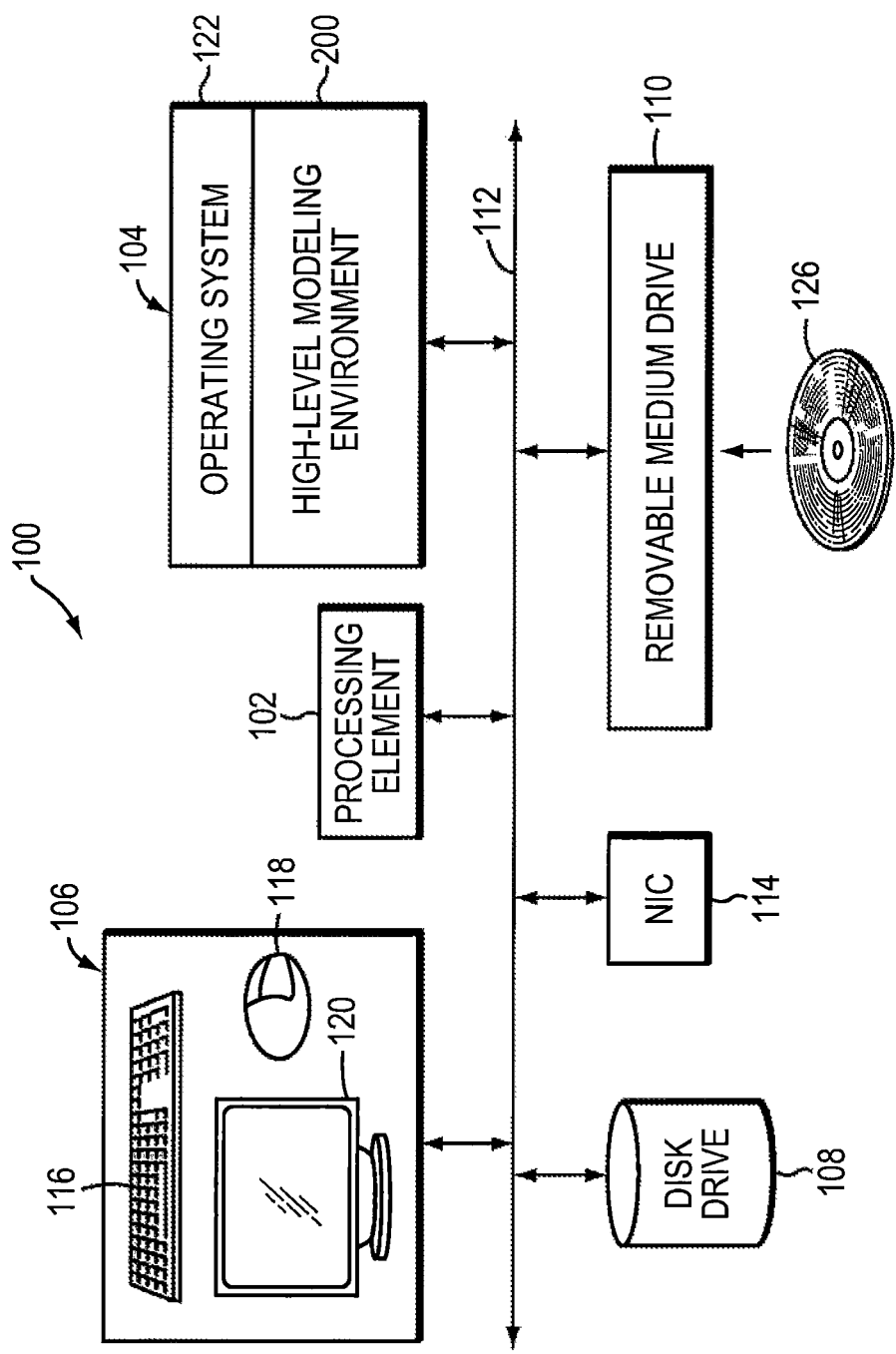
FIG. 1 is a schematic illustration of a data processing system in accordance with an embodiment of the disclosure.

Exemplary embodiments of the disclosure generate executable models having objects configured to run in accordance with message-based execution semantics. A message may include a payload comprising one or more data elements that may not change during the execution of the model. In addition, a message may be generated at a particular point in the execution or simulation time of the model by a message sender object, and the message may persist for a determined time interval of the total model execution or simulation time.

A message-based modeling entity, which may be included within a modeling system, may support message-based functionality in the model. The system may include a library of pre-defined object types, such as graphical block types, configured to generate and send messages, and to receive and process messages. The library of message-based blocks may be organized as a class hierarchy. The modeling environment may include a graphical editor that provides a model canvas in which a user may construct and/or edit a model. Message-based objects may be configured to have one or more message ports for sending and receiving messages. In response to the message ports of selected objects being interconnected, such as through message-based connections extending from source ports to destination ports, the system may establish message-based relationships among the interconnected objects.

The system may establish one or more message queues for storing messages. The message queues may have attributes, such as a length, a processing order, an overflow policy, and a priority. Message generated during execution of the model may be logged and may be routed to other message queues and/or message-based receiver objects.

The system may also include a message-based execution engine that controls the execution of the model's message-based objects. More specifically, during execution, a message sender object may generate a message at a particular point in the execution time of the model. The message-based execution engine may maintain the message for a determined portion or time interval of the total execution time of the model. In addition, the execution engine may send the message to one or more message-based receiver objects, which may or may not trigger their execution, and the execution engine may control the processing of the message by the one or more message-based receiver blocks.

In an embodiment, the modeling system may include entities or modules that support other execution domains, such as a time-based and state-based execution domains. In addition, the message-based modeling entity may cooperate with such a time-based and/or state-based execution entities or modules to implement hybrid execution models.

The time-based entity or module may include a library of time-based objects or blocks, and selected time-based objects or blocks may be added to the model. A time-based block describes a dynamic system of equations that defines time-based relationships between signals and state variables. Signals represent quantities that change over time, and may have values at all points in time. The relationships between signals and state variables may be defined by the set of equations represented by the time-based blocks. Time-based blocks may include signal ports that may be interconnected with signal-based connections. The source of a signal corresponds to the block that writes to the signal during the evaluation of the block's equations, and the destination of the signal is the block that reads the signal during the evaluation of the destination block's equations.

The state-based entity or module may include a library of state-based objects, such as states, sub-states, transitions, junctions, etc. The state-based objects may be configured to generate and/or receive messages. For example, programming syntaxes, such as a textual programming syntax, may be defined for generating and/or evaluating messages by state-based objects. In addition, state transitions may be guarded by messages. For example, the programming syntaxes may support the specification of particular messages to guard transitions or other state-based objects.

The time-based execution engine executes the time-based blocks in the diagram by evaluating the relationships between signals and state variables over time beginning at a start time and continuing to a stop time. Each evaluation of the relationships may be referred to as a time step.

As mentioned, the message-based system and the time-based and/or state-based execution engines may cooperate to implement a hybrid environment. In particular, the time-based execution engine may organize time-based and/or state-based blocks or objects into a scheduled or sorted order, which refers to the order in which the blocks' operations or methods (e.g., execution methods), are invoked. The time-based and/or state-based blocks or objects may then be executed according to the scheduled order.

The message-based system may also include a verification engine. The verification engine may support a library containing one or more verification blocks. Instances of the verification blocks may be added to the model to evaluate the operation of message-based blocks. The types of verification blocks may include an observer type, a message sink type, a generator type, and a scenario type. The observer block may be used to visualize a set of messages, referred to as a trace, generated by one or more selected message-based objects of the model. The set of messages of the trace may be ordered in time between a start time and an end time by the observer block. The observer block may be a floating block within the model, and it may be associated with a message-based connection. The message sink block may be directly connected to a message-based block, and may be used to visualize a trace generated by that message-based block. The generator block may be used to represent an external source of messages to the model. The generator block may be connected to one or more message-based blocks as a source, and configured to generate one or more messages or traces that may then be received and processed by the one or more message-based blocks to which the generator block is connected. The scenario block may be used to define valid and invalid traces. It may also or alternatively be used to define one or more constraints on one or more messages or traces. For example, temporal constraints may be defined on one or more messages, or between two or more messages. The scenario block may be associated with one or more message-based connections in the model whose messages may form a runtime trace to be evaluated. The scenario block may compare the defined valid and invalid traces, and the one or more constraints, to the runtime trace produced during execution of the model. The scenario block may be further configured to take one or more actions if one or more of the runtime traces is not equivalent to the defined valid traces, or the runtime traces are equivalent to the defined invalid traces. The scenario block may also take a specified action if the one or more constraints are not satisfied.

FIG. 1 is a schematic illustration of a computer or data processing system 100 for implementing and utilizing an embodiment of the disclosure. The computer system 100 includes one or more processing elements, such as a processing element 102, a main memory 104, user input/output (I/O) device 106, a data storage unit, such as a disk drive 108, and a removable medium drive 110 that may all be interconnected by a system bus 112. The computer system 100 may also include a communication unit, such as a network interface card (NIC) 114. The user I/O device 106 may include a keyboard 116, a pointing device, such as a mouse 118, and a display 120. The main memory 104 may store a plurality of libraries or modules, such as an operating system 122, and one or more applications running on top of the operating system 122, including a high-level modeling environment 200.

The removable medium drive 110 may accept and read a computer readable medium 126, such as a CD, DVD, floppy disk, solid state drive, tape, flash memory or other medium. The removable medium drive 110 may also write to the computer readable medium 126.

Suitable computer systems include personal computers (PCs), workstations, laptops, tablets, palm computers and other portable computing devices, etc. Furthermore, exemplary processing elements include single or multi-core Central Processing Units (CPUs), Graphics Processing Units (GPUs), Field Programmable Gate Arrays (FPGAs), Application Specific Integrated Circuits (ASICs), etc. Nonetheless, those skilled in the art will understand that the system 100 of FIG. 1 is intended for illustrative purposes only, and that the present disclosure may be used with other computer systems, data processing systems or computational devices. The present disclosure may also be used in a networked, e.g., client-server, computer architecture, or a public and/or private cloud computing arrangement.

Suitable operating systems 122 include the Windows series of operating systems from Microsoft Corp. of Redmond, Wash., the Linux operating system, the MAC OS® series of operating systems from Apple Inc. of Cupertino, Calif., and the UNIX® series of operating system, among others.

A user or developer, such as an engineer, scientist, programmer, etc., may utilize the keyboard 116, the mouse 118, and the display 120 to operate the high-level modeling environment 200, and construct or open one or more models of a system that is being designed. The model, which may have executable semantics, may represent a real-world dynamic system that is being modeled, simulated, and/or analyzed by the user.

Figure 2:
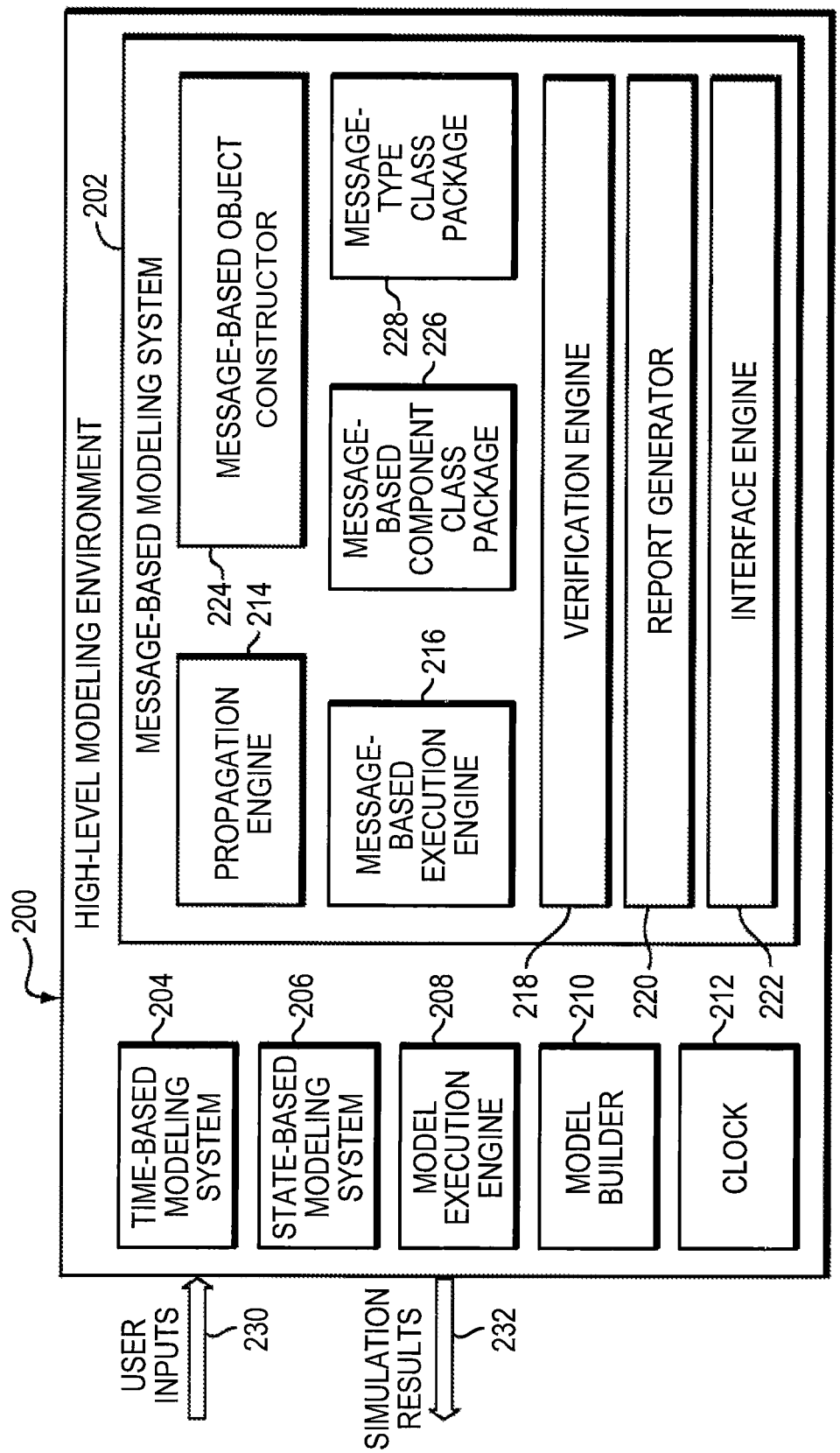
FIG. 2 is a partial, functional diagram of a high-level modeling environment in accordance with an embodiment of the disclosure.

FIG. 2 is partial block diagram of an embodiment of the high-level modeling environment 200. The environment 200 may include a message-based modeling system 202, and one or more additional modeling systems, such as a time-based modeling system 204, and a state-based modeling system 206. The environment 200 also may include a model execution engine 208, a model builder 210, and a clock source, such as clock 212. The message-based modeling system 202 may include a plurality of components or modules. In particular, it may include a propagation engine 214, a message-based execution engine 216, a verification engine 218, a report generator 220, and an interface engine 222. The system 202 may also include an object constructor 224 that may access one or more class packages, such as message-based component class package 226, and a message-type class package 228.

In an implementation, high-level modeling environment 200 may receive inputs by a user as the user creates, edits, revises, and/or opens one or more models, as indicated by arrow 230. The model execution engine 208 in cooperation with the modeling systems 202, 204 and 206 may execute the model generating one or more results that may be presented to the user, as indicated by arrow 232. A model may include a plurality of portions each operating according to a different execution domains. For example, a first portion may operate according to message-based semantics, a second portion may operate according to time-based semantics, and a third portion may operate according to state-based semantics.

In an embodiment, a graphical model may be executable such that the model receives one or more inputs, processes those inputs, and produces one or more outputs.

In an embodiment, a suitable high-level modeling environment includes the MATLAB® technical computing environment from The MathWorks, Inc. of Natick, Mass. The high-level modeling environment may thus operate at a level that is even higher than other well-known programming languages, such as the C, C++, and C# programming languages. A suitable time-based graphical modeling system includes the SIMULINK® environment from The MathWorks, Inc. A suitable state-based modeling system includes the Stateflow charting tool from The MathWorks, Inc.

It should be understood that other modeling tools in addition to or in place of the time-based modeling system 204 and/or the state-based modeling system 206 may be used in the environment 200. Other such modeling tools include dataflow systems, such as the LabVIEW programming system from National Instruments Corp. of Austin, Tex., and the Visual Engineering Environment (VEE) from Agilent Technologies, Inc. of Santa Clara, Calif., physical modeling systems, such as The Simscape product from The MathWorks, Inc., Unified Modeling Language (UML) systems, and Systems Modeling Language (SysML) systems, among others. In addition, a lower level programming language, such as the C, C++, and C# programming languages, among others, may also be used to create one or more models or model portions.

The propagation engine 214, message-based execution engine 216, verification engine 218, report generator 220, interface engine 222, message-based object constructor 224, and class packages 226, 228 may each comprise registers and combinational logic configured and arranged to produce sequential logic circuits. In an embodiment, the propagation engine 214, message-based execution engine 216, verification engine 218, report generator 220, interface engine 222, message-based object constructor 224, and class packages 226, 228 may be implemented through one or more software modules or libraries containing program instructions pertaining to the techniques described herein. The software modules may be stored on main memory 104 and/or computer readable media, such as computer readable medium 126, and executable by one or more processing elements, such as processing element 102. Other computer readable media may also be used to store and execute these program instructions. In alternative embodiments, various combinations of software and hardware, including firmware, may be utilized to implement the present disclosure.

In an embodiment, the message-based components of a graphical model as well as the messages generated during execution of the model may be objects, and these objects may be defined by creating "classes" which are not objects themselves, but which act as templates that instruct the constructor 224 how to construct an actual component and message object. A class may, for example, specify the number and type of data variables and the steps involved in the functions which manipulate the data. The object constructor 224 may use the corresponding class definition and additional information, such as arguments provided during object creation, to construct the object. Likewise, objects may be destroyed by a special function called a "destructor". Objects may be used by manipulating their data and invoking their functions.

Figure 3:
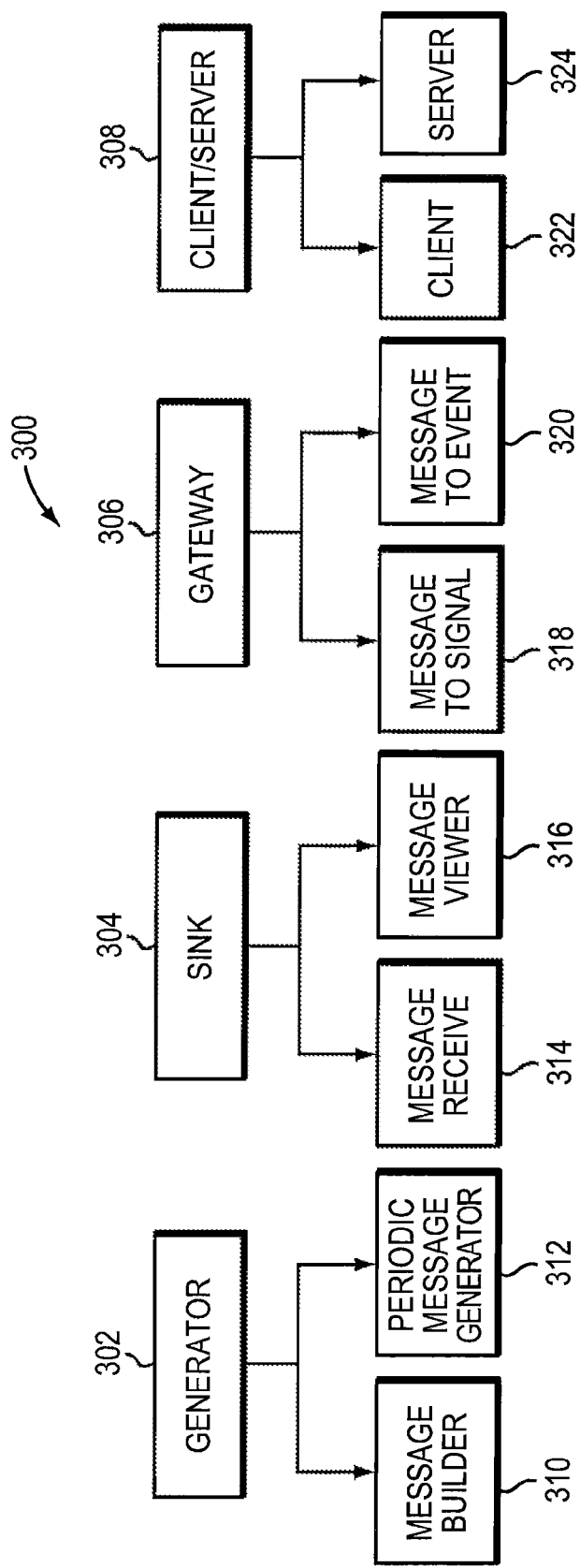
FIG. 3 is a schematic illustration of a class hierarchy of message-based components in accordance with an embodiment of the disclosure.

FIG. 3 is a schematic illustration of an exemplary class hierarchy 300 of message-based components. Instances of objects defined in the class hierarchy 300 may be constructed for use in a graphical model. The class hierarchy 300 may include one or more base classes, such as a Generator class 302, a Sink class 304, a Gateway class 306, and a Client/Server class 308. In addition, one or more of the base classes may include one or more derived classes, which may also be referred to as sub-classes. For example, the Generator base class 302 may include a Message Builder subclass 310 and a Period Message Generator subclass 312. The Sink base class may include a Message Receive subclass 314 and a Message Viewer subclass 316. The Gateway base class 306 may include a Message to Signal subclass 318 and a Message to Event subclass 320. The Client/Server base class 308 may include a Client subclass 322 and a Server subclass 324.

It should be understood that other, possibly more complex, class hierarchies may be provided. For example, additional base classes may be provided, and one or more of the subclasses may include subclasses of its own, and so on.

Figure 4:
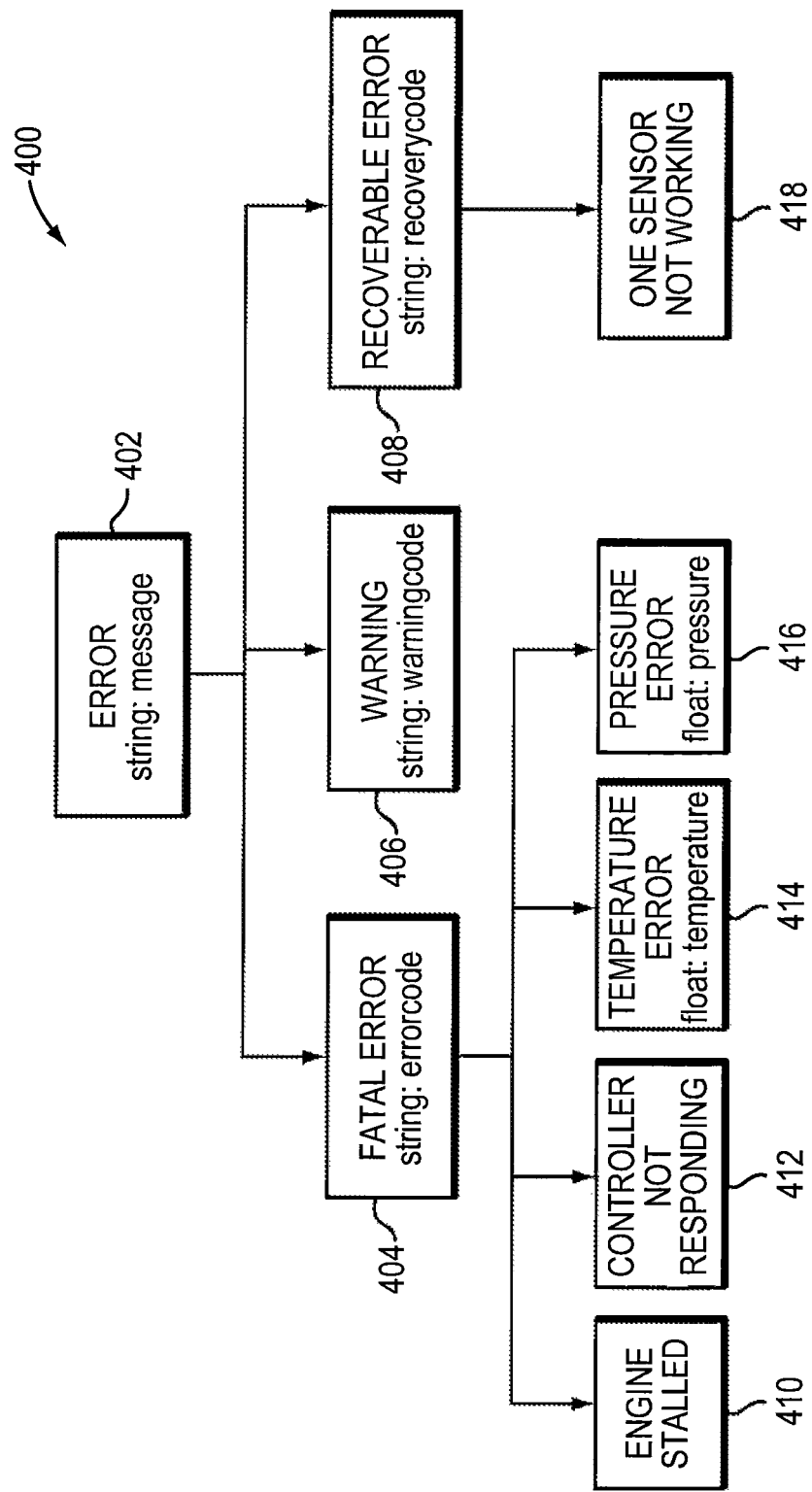
FIG. 4 is a schematic illustration of a class hierarchy of message types in accordance with an embodiment of the disclosure.

FIG. 4 is a schematic illustration of an exemplary class hierarchy 400 of message types, such as error messages. The hierarchy 400 may include an Error base class 402. The Error base class 402 may have one string property named "message". The Error base class 402 may include a plurality of derived classes, such as a Fatal Error subclass 404, a Warning subclass 406, and a Recoverable Error subclass 408, which may define other class specific properties. The Fatal Error subclass 404 may have one string property named "errorcode". The Warning subclass 406 may have one string property named "warningcode". The Recoverable Error subclass 408 may have one string called "recoverycode". Furthermore, the Fatal Error subclass 404 may have a plurality of derived classes, such as an Engine Stalled subclass 410, a Controller Not Responding subclass 412, a Temperature Error subclass 414, and a Pressure Error subclass 416. The Temperature Error subclass 414 may have one floating point property called "temperature", and the Pressure Error subclass 416 may have one floating point property called "pressure". The Recoverable Error subclass 408 may have one derived class, such as a One Sensor Not Working subclass 418.

While the message types are referred to as classes, in an embodiment, they do not have any methods. Instead, the specialization of the message classes may add new properties, i.e., data members, only.

Figure 5:
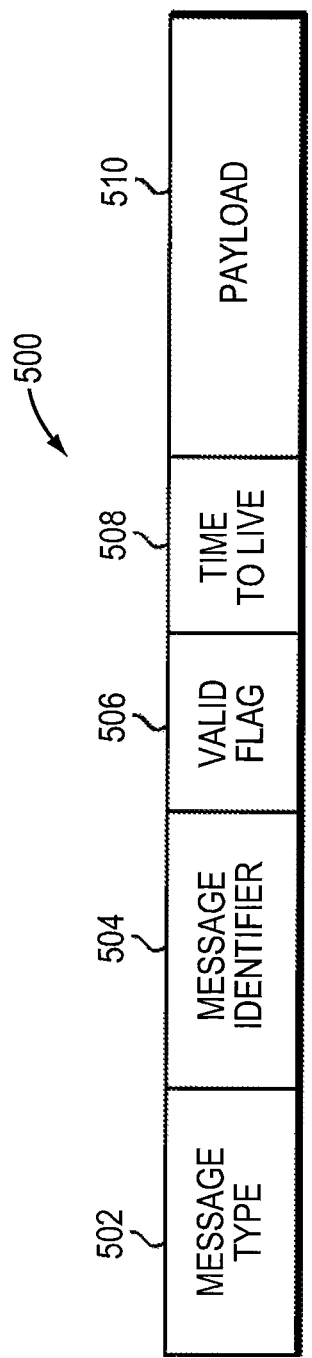
FIG. 5 is a schematic illustration of a data structure for storing data elements of a message in accordance with an embodiment of the disclosure.

In an embodiment, an instance of a message object may include one or more data elements. FIG. 5 is a schematic illustration of a data structure 500 representing the data elements of an instance of a message object. The data structure 500 may be organized into a plurality of fields and sub-fields each storing particular information. For example, the data structure 500 may include a message type field 502, a message identifier (ID) field 504, a valid flag 506, a time to live (TTL) field 508, and a payload field 510. The message type field 502 may store information that indicates the particular type of message, the message ID field 504 may store an identifier that uniquely identifies the message, the valid flag 506 may indicate whether the message is valid or invalid, the TTL field 508 may store information indicating how long the message should be maintained, and the payload field may store information associated with the message that was generated by the message source and that may be used by one or more message destinations.

It should be understood that the data structure may include additional or fewer fields. In addition, the payload field 510 may be organized into a plurality of sub-fields.

In another embodiment, message-based components and/or messages may be instances generated from types, instead of being objects generated from classes. Those skilled in the art will understand that other implementations of message-based components and/or messages may be utilized.

Figure 6A:
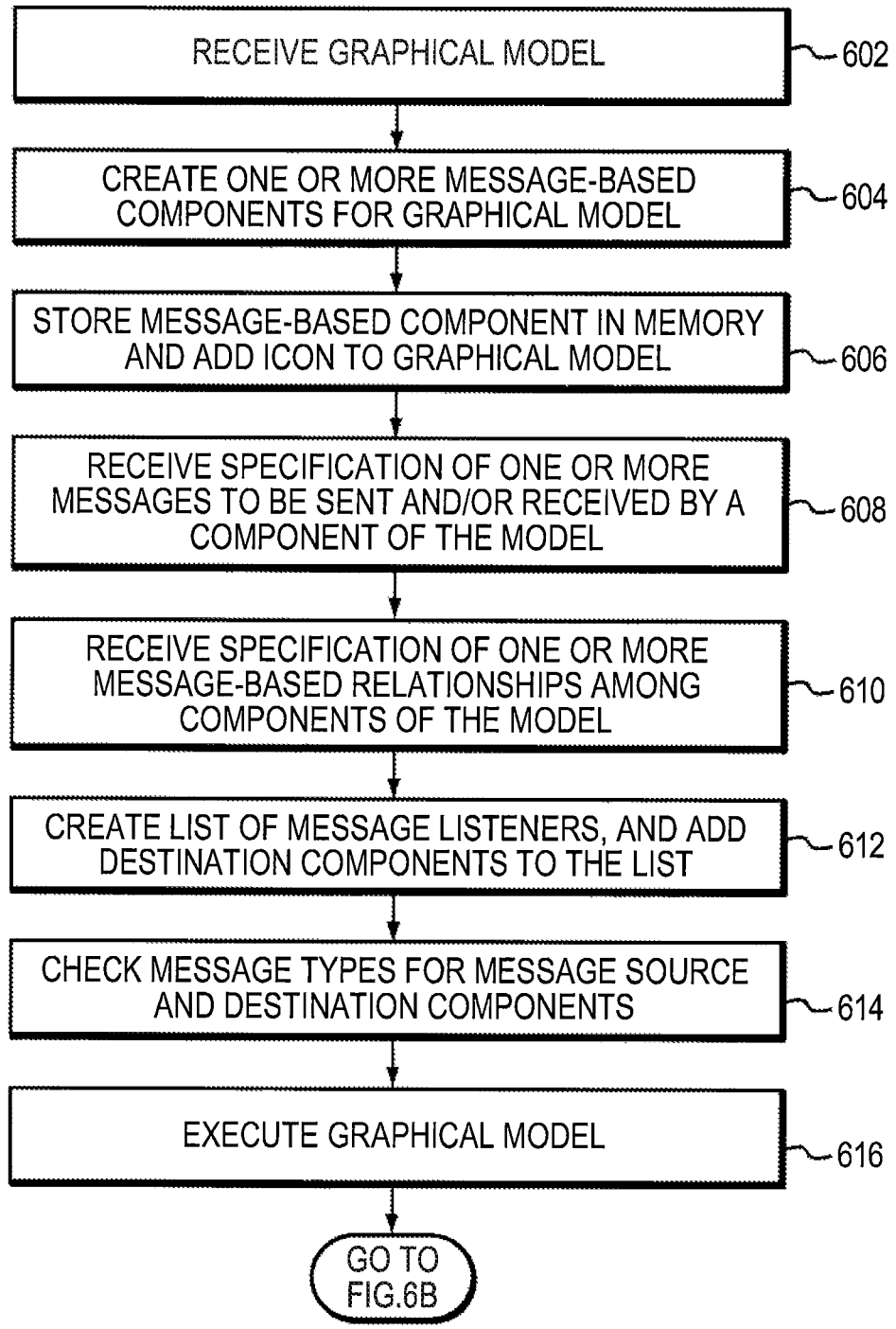
FIGS. 6A-6C are partial views of a flow diagram of exemplary processing that can be used in accordance with an embodiment of the disclosure.
Figure 6B:
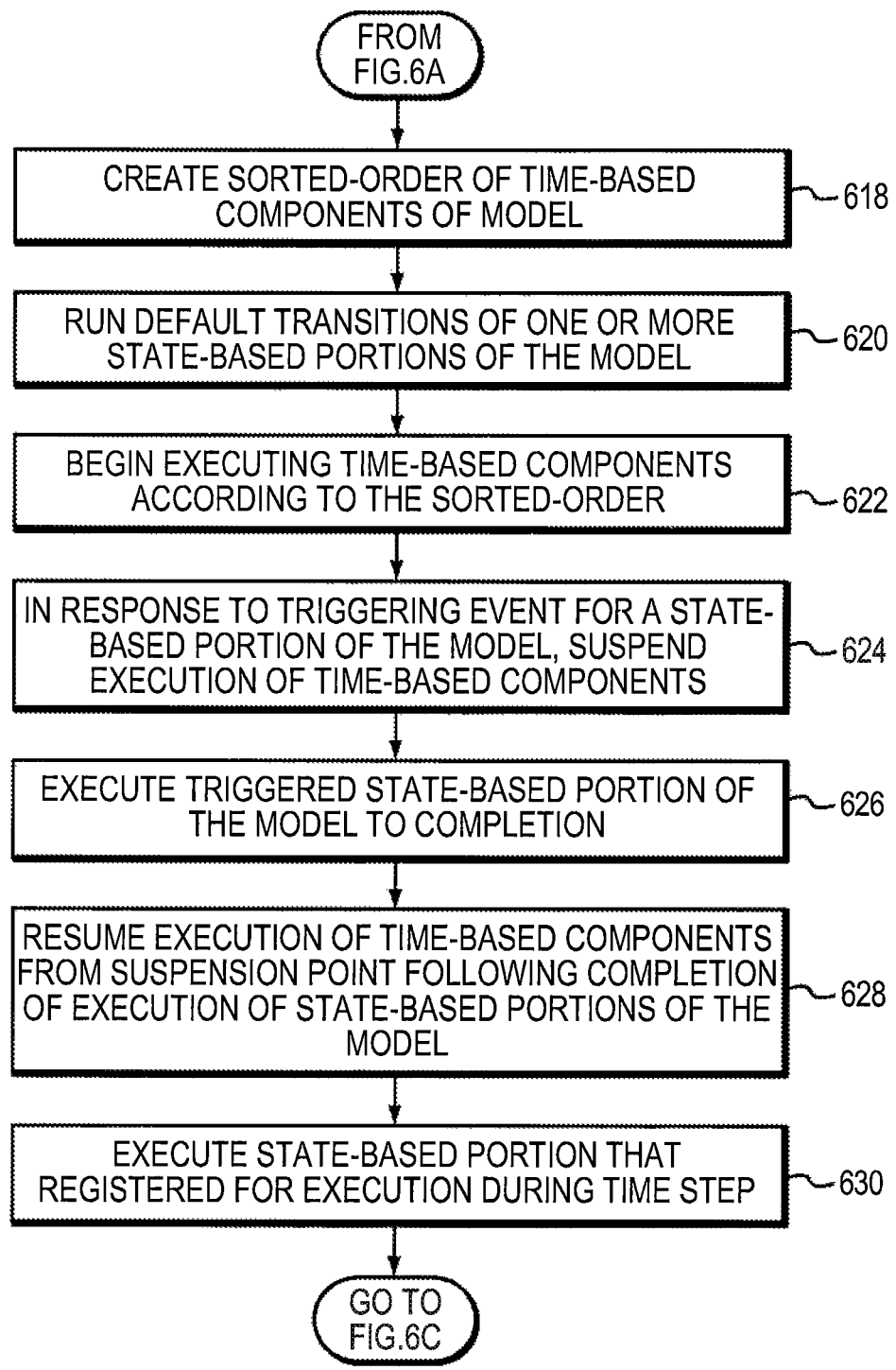
Figure 6C:
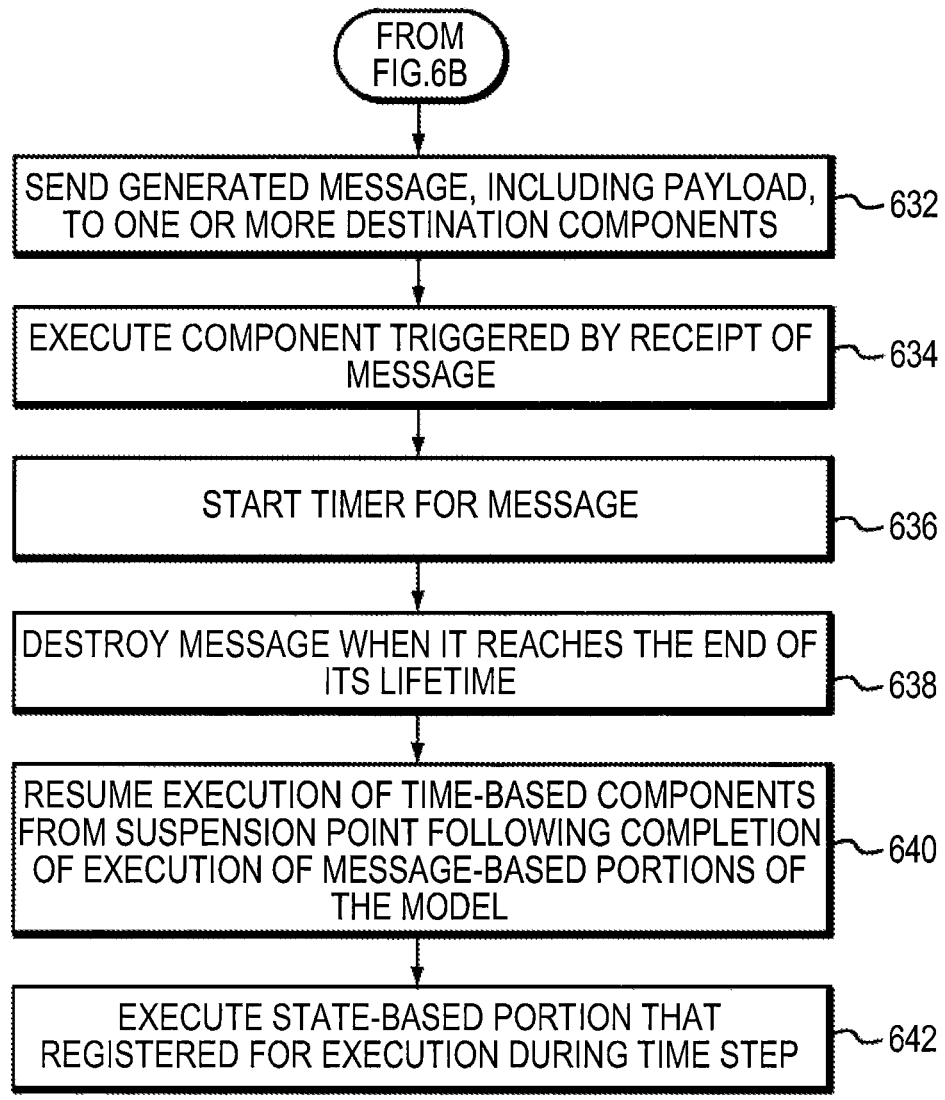

FIGS. 6A-C is a flow diagram illustrating exemplary processing for practicing an embodiment of the disclosure. The high-level modeling environment 200 may receive inputs from a user constructing or opening a model, as indicated at block 602. Environment 200 may support the creation of models through graphical, textual, or a combination of graphical and textual inputs. The user may operate and interact with environment 200 through the user I/O 106, such as the keyboard 116, mouse 118, and display 120. For example, the environment 200 and/or one or more of the message-based modeling system 202, the time-based modeling system 204, and the state-based modeling system 206 may present one or more model editor windows on the display 120. The model editor may include a plurality of graphical elements, such as a menu bar, a tool bar, and a canvas. In addition, the message-based modeling system 202, the time-based modeling system 204, and the state-based modeling system 206 may each provide a library browser window or palette that presents a plurality of component types. The user may select one or more component types from the library browsers or palettes, and place respective ones of those components on the canvas. The user may then connect the components, e.g., with connections, that may appear as lines or arrows on the canvas, thereby establishing message-based, mathematical time-based, state-based, dataflow, or other relationships among the components placed onto the canvas.

The environment 200 may also support the creation of a model programmatically.

In an embodiment, a user may select one or more types of message-based components from the library browser. In response, the constructor 224 may access the component class package 226, and create an object instance of the selected type, as indicated at block 604. The object instance may be stored in memory, such as main memory 104, and an icon, such as a block, may be added to the canvas, as indicated at block 606.

The user may configure one or more of the components of the model to generate and/or receive a message, as indicated at block 608. For example, a user may open a properties or other page associated with a selected message-based component that has been added to the canvas. The property page may include fields or other data entry elements for receiving information, for example, from the user, specifying a message type that the component is to receive. In response, the object constructor 224, or another module, such as the model builder 210, may add an input port to the block as presented on the canvas. Similarly, the property page, or another property page, may include fields and data entry elements for receiving information that specifies a message type that a selected component is to send. In response, an output port may be added to the block as presented on the canvas. In this way, a user may add a plurality of blocks representing message-based components to the canvas, and provide these blocks with input and output ports for receiving and sending messages.

The user may define message-based relationships among the message-based components of the model as well as the other components, as indicated at block 610. For example, the user may define a message-based relationship graphically by drawing a message-based connection between the input and output ports of message-based blocks. More specifically, the user may configure a given message-based component to receive a particular message by drawing a connection from the source of the message, such as the output port of another message-based component, to the respective input port of the given message-based component. Likewise, the user may configure a selected message-based component to send a message by drawing a connection from the respective output port of the selected message-based component to the destination of the message. In response to the definition of message-based relationships, e.g., by the user, the message-based execution engine 216 may add the destination component to a list of listeners for the respective message, as indicated at block 612. Specifically, the execution engine 216 may create a list of listeners for each message for which a message-based relationship has been defined in the model. If a message-based relationship is removed, for example, by the user deleting a message-based connection between two message-based blocks, the execution engine 216 may remove the destination component from the list of listeners for that message.

In an embodiment, model components operating in domains other than the message-based execution domain, may be configured to send or receive messages. For example, a user may draw a message-based connection between a message-based block and a block operating in another domain, such as the time-based domain, the state-based domain, the dataflow domain, etc. Likewise, a user may draw a message-based connection from a block operating in another domain to a message-based block.

Figure 7A:
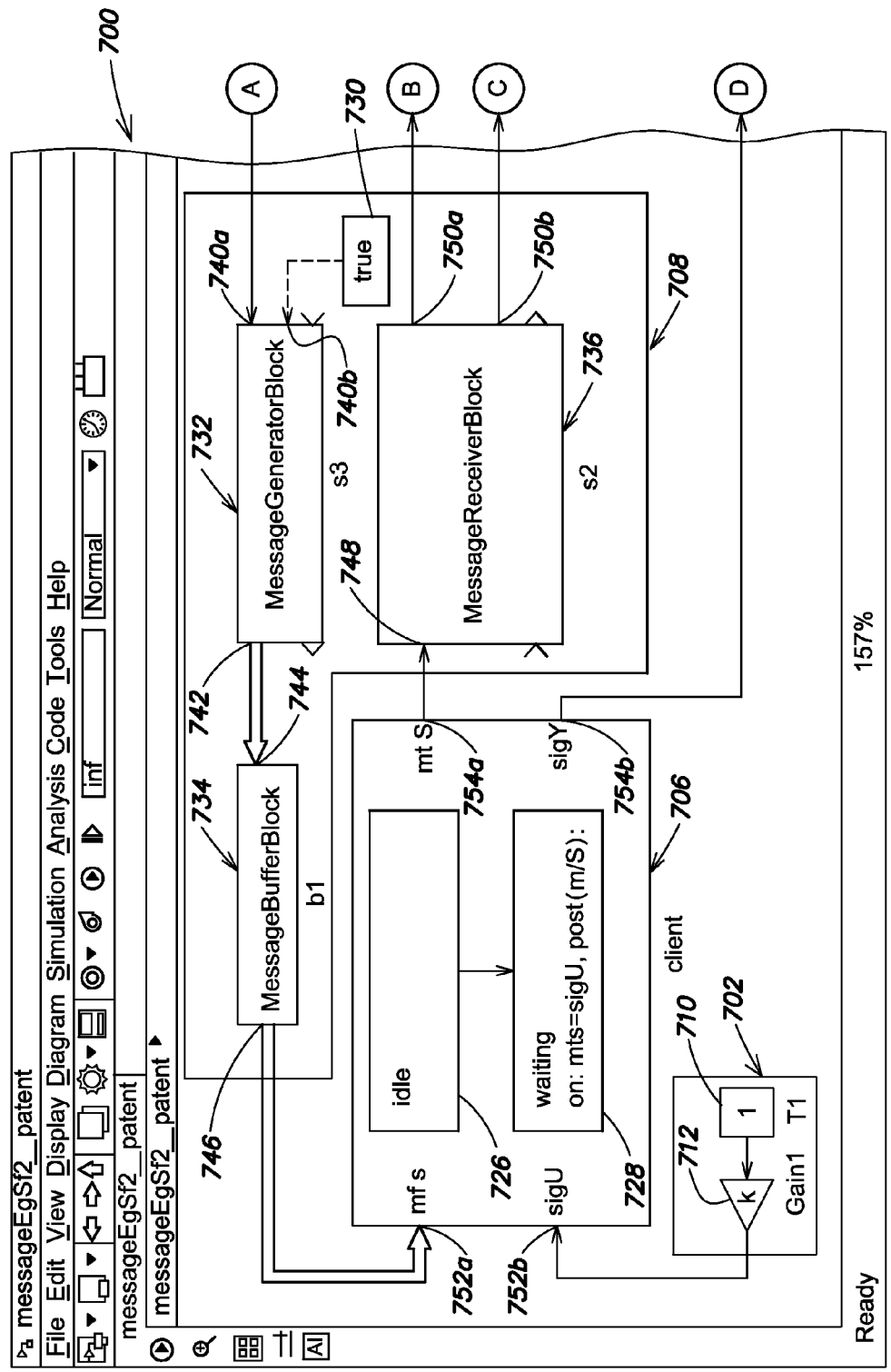
FIGS. 7A and 7B are partial views of an illustration of a graphical model having executable semantics in accordance with an embodiment of the disclosure.
Figure 7B:
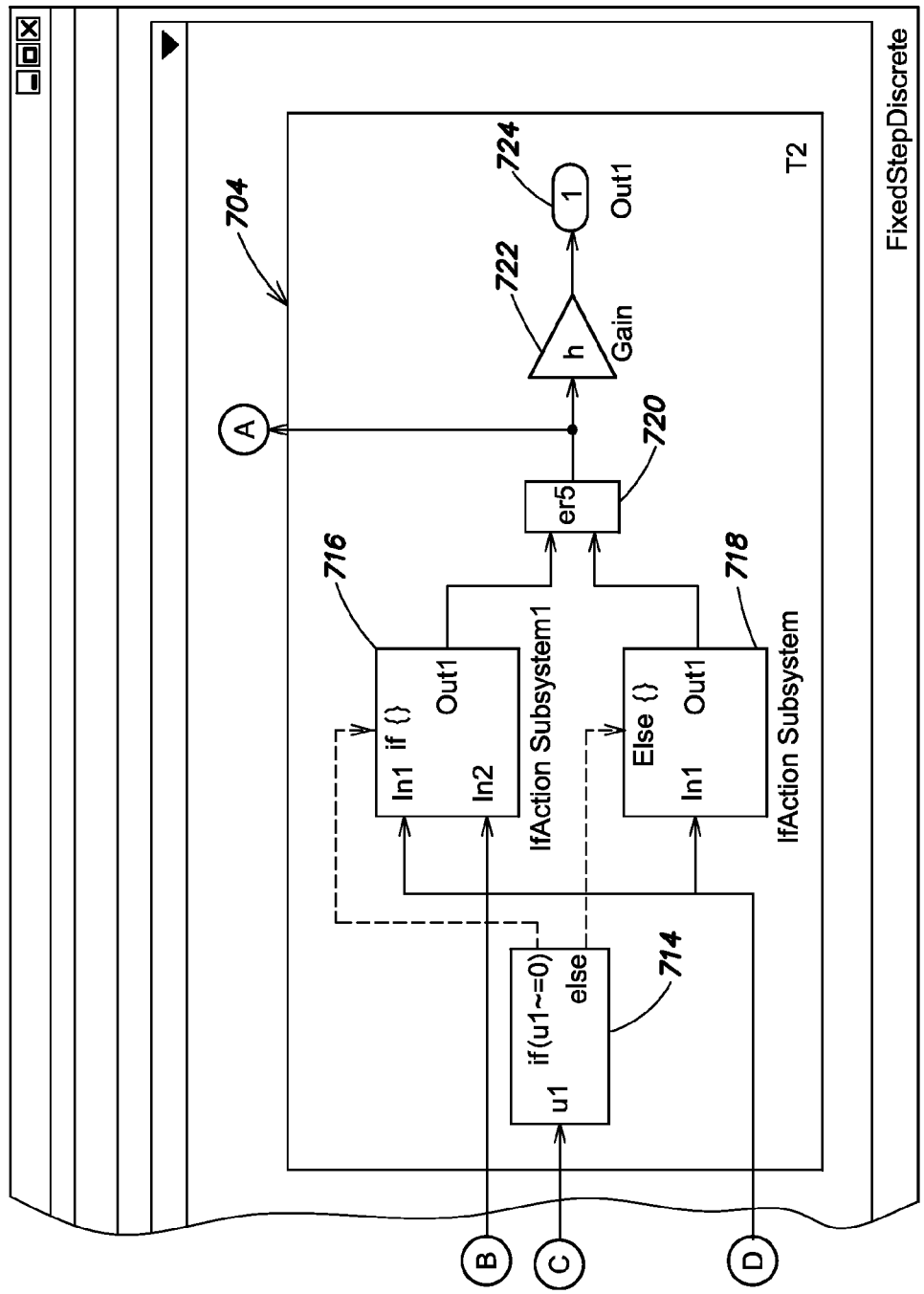

FIGS. 7A and 7B are partial views of a schematic illustration of an exemplary graphical model 700. The model 700 may be constructed and/or opened by a user. The model 700 may include a first time-based portion 702, a second time-based portion 704, a state-based portion 706, and a message-based portion 708. Each portion may include a plurality of components, such as blocks or subsystems. Specifically, the first time-based portion 702 may include a Constant block 710 and a Gain block 712. The second time-based portion 704 may include an If block 714, a first Subsystem 716, a second Subsystem 718, a Mux block 720, a Gain block 722, and an Outport block 724. The state-based portion 706 may include an Idle state 726 and a Waiting state 728. The message-based portion 708 may include a True block 730, Message Generator block 732, a Message Buffer block 734, and a Message Receive block 736.

The Message Generator block 732 may be configured to have two input ports 740a, 740b, each associated with a respective type of message that the Message Generator block 732 is interested in receiving. The Message Generator block 732 also may be configured to have one output port 742 that is associated with a message type that the Message Generator block may send. The Message Buffer block 734 may be configured with an input port 744 and an output port 746, each associated with a respective message type. The Message Receive block 736 may be configured with an input port 748 and two output ports 750a, 750b, each associated with a respective message type. In addition, the state-based portion 706 may be configured with a first input port 752a that is associated with a type of message, and a second input port 752b that is associated with a signal. The state-based portion 706 may be further configured with a first output port 754a that is associated with a type of message, and a second output port 754b that is associated with a signal.

In an embodiment, the data type of a message payload may specify the type of message.

Message-based relationships may be established among the time-based portions 702, 704, the state-based portion 706, and the message-based portion 708. For example, a user may connect various input and output blocks of the model 700 with message-based connections. In response, constructor 224 may create message object instances, and the execution engine 216 may establish message-based relationships among the respective portions or components of the model 700.

In an embodiment, before execution of the model 700, the propagation engine 214 may analyze the construction and configuration of the model 700 to determine whether, during execution of the model 700, those blocks that are configured to receive messages will receive the intended messages, as indicated at block 614. In particular, the message-based execution engine 216 and the model execution engine 208 may build an in-memory representation of the model 700, such as an intermediate representation (IR). The IR may include a plurality of nodes, that may represent the blocks of the model 700, and edges that represent connections within the model. The IR may also be annotated with additional information, such as the types of messages that destination blocks are configured to receive, the types of messages that source blocks are configured to send, etc. The IR may be created as part of a compilation stage that marks the start of model execution. This compilation stage may include preparing data structures and evaluating parameters, configuring and propagating block characteristics, determining block connectivity, and performing block reduction and insertion. In addition, one or more optimization techniques may be applied to the IR. After the application of an optimization technique, an additional IR may be generated. The propagation engine 214 may analyze one or more of these IRs.

The propagation engine 214 may evaluate this IR examining, for example, those elements of the IR that represent the input ports of message-based and other blocks. The propagation engine 214 may determine the type of message that the given message-block expects to receive on a subject input port. The propagation engine 214 also may identify the upstream block that is connected to the subject input port of the given message-based block. The propagation engine 214 may determine the type of message issued by this upstream block. In addition, the engine 214 may determine whether the type of message defined for the output port of the source component complies with the type of message defined for the input port of the destination component. If a mismatch is identified by engine 214, it may be reported. For example, an error message or error report may be generated and presented, for example on the display 120 for review by the user.

The model 700 may be simulated, e.g., executed or run. For example, the model editor window may include a Run command button that may be selected by the user, e.g., with the mouse 118. Alternatively, the user may enter a text-based run command, for example, in a Command Line Interface (CLI), or the model may be run programmatically.

In an embodiment, the model execution engine 208 interfaces with the time-based system 204, the state-based system 206, and the message-based system 202 to execute the entire model 700, as indicated at block 616.

In an embodiment, the time-based modeling system 204 may create a sorted order of the time-based components of the model 700, as indicated at block 618. The sorted order may refer to the order in which to invoke block methods, during execution of the model 700. Exemplary block methods for time-based components may include an output method that computes the output signals of the block based on its input signals and its state, an update method that computes the block's states, and a derivatives method that computes the derivatives of the block's continuous states. Time-based components that are configured to execute together may be identified as a group in the sorted order. For example, a time-based subsystem may include a plurality of time-based blocks, and the subsystem may be configured to run as an atomic subsystem. In this case, all of the time-based blocks of the atomic subsystem execute atomically as a group. The time-based modeling system 204 may also define a simulation start time, a simulation end time, and a plurality of time steps between the start and end times. The size of the time steps may depend on the particular solver being used to execute the model.

Input and output signals may be represented graphically in the model or block diagram by arrow elements extending between time-based blocks. Input and output signals represent quantities, for example, input and output data that change over time during the execution of the model, and the quantities represented by the signals may be defined, and thus have values, for all points in time between a model's start time and its stop time. Execution of a model may also be referred to as simulation of the model.

In an embodiment, one or more initialization steps may be performed before execution of the model begins. For example, one or more state-based portions of the model may execute one or more default transitions, as indicated at block 620. Initialization steps for message-based portions of the model may involve typical operations, such as dequeuing a waiting message.

For each time step of the simulation, which may begin with the simulation start time, execution of model may proceed as follows. The time-based modeling system 204 in cooperation with the model execution engine 208 may begin executing the time-based components of the model according to the sorted order, as indicated at block 622. If an event that is a triggering event for a state-based portion of the model occurs, the execution of the time-based components may be suspended, as indicated at block 624. The triggered state-based portion may be executed as an atomic unit, for example, by the state-based modeling system 206 in cooperation with the model execution engine 208, as indicated at block 626. Upon completing the execution of the state-based portion, the execution of the time-based components may resume from the point in the sorted-order at which execution had been suspended, as indicated at block 628. For example, the model execution engine 208 may record where in the sorted order the execution was suspended to execute the state-based portion.

In an embodiment, an input triggering event may occur outside of a state-based portion, for example, by a time-based or other component, but may be visible within the state-based portion. Exemplary input trigger events may include an edge-triggered input event and a function call, for example, from a time-based component. An edge-triggered input event may be configured to operate on a rising edge, a falling edge, or either a rising or falling edge. To operate as an input edge-triggered input event, a signal from a time-based component may need to cross zero, such as a changing from −1 to 1. In contrast, a function-call input event may consist of an instantaneous flow of control from a caller subsystem to a callee subsystem. A triggering event for a state-based portion, whether it is an edge, function call or other trigger, may not provide any input data to the state-based portion, which the state-based portion might otherwise use for processing, for example to generate output data. Instead, the triggering event may operate as a control signal that triggers execution of the state-portion, and the state-based portion may operate upon input data that is internal to the state-based portion, or that is received in other ways besides a triggering event.

If the triggering event for the state-based portion occurs during the execution of a group of time-based components that are configured to execute atomically, then the execution of the entire group of time-based components may be completed. Further execution of time-based components may then be suspended, and the execution of the triggered state-based system performed.

If a message is generated and sent, for example, during the execution of time-based components according to the sorted order, then the execution of time-based components may be suspended, as indicated at block 630. The message-based execution engine 216 may examine the list of listeners for the respective message. The execution engine 216 may send the message to the components on the list of listeners, as indicated at block 632. If the destination component is triggered by the receipt of the message, the execution engine 216 may execute the destination component, as indicated at block 634. The message-based execution engine 216 may also start a timer associated with the generation of a message, and may track the age of the message, as indicated at block 636. For example, the engine 216 may use the clock 212 to operate one or more timers. When the age of the message reaches its maximum age, which may be indicated in message's TTL field 508, the message may be destroyed by the message-based execution engine 216, as indicated at block 638. Each message may thus persist for only a defined time period during the execution of a model.

Upon completing the execution of the components triggered by the message, the execution of the time-based components may resume from the point in the sorted-order at which execution had been suspended, as indicated at block 640.

It should be understood that the model execution flow described in connection with one or more of steps 622 to 640 may be nested. For example, the execution of a state-based portion may generate a message triggering the execution of a message-based portion, which may trigger the execution of a state-based portion, and so on.

It should be understood that a message may be sent to a message-based component, a state-based component, a time-based component, or some other component. In addition, the message-based component, the state-based component, and the time-based component may execute in response to the received message.

The life-time of a message may depend on the semantics of the message processing environment. A message implemented using function-call semantics may get created and consumed in the same time-step, thus resulting in a lifetime of a single time-step. In the presence of queuing semantics, messages can be produced in one time-step but wait in a message queue for a number of time-steps before they are consumed. In addition, the consumer can choose to process a message without consuming the message, thus resulting in messages with potentially infinite lifetime.

In an embodiment, instead of sending a message to a destination component, the message-based execution engine 216 may notify a destination component that a message has been created. In response, the destination component may retrieve the message. If the destination component fails to retrieve the message before its maximum age is reached, the message may be destroyed before ever being retrieved.

In an embodiment, a message-based component may be configured, upon sending a message, to expect a reply to its message. Such a component may be configured to execute in a synchronous or asynchronous manner. For example, the component may be configured to execute synchronously in which case the component, after sending its message, waits to receive the reply before continuing with its execution. Alternatively, the component may be configured to execute asynchronously in which case the component, after sending its message, proceeds with its execution without waiting for the reply.

In an embodiment, a state-based portion of the model may be configured to execute during a time step even though no triggering event for that state-based portion occurred during the time step. More specifically, a state-based portion may register for time-based triggering. If the model includes a state-based portion that is registered for time-based triggering, and the state-based portion has not already executed during the current time step, then the model execution engine 208 may execute the state-based portion, as indicated at block 642.

At this point, execution during the current time step may be complete. If the current time step does not equal the simulation end time, the current time step may be incremented and the execution process may be repeated. This process, for example steps 622 to 640, may be repeated for each time step between the simulation start time and the simulation end time.

Referring to model 700 (FIGS. 7A and 7B), execution at each time step may proceed as follows. Time-based Constant and Gain blocks 710 and 712 may execute first as they may be the first blocks in the sorted order. The signal output of Gain block 712 may be a trigger event for the state-based portion 706. Accordingly, after Gain block 712 executes, execution of other time-based components may be suspended, and the state-based portion 706 may be executed. The Message Receiver block 736 is configured to listen for a message from the state-based portion 706 on input port 748. If the execution of the state-based portion 706 results in the generation and sending of this message, the message is received by Message Receiver block 736 causing it to be executed. Next, the blocks of the second time-based portion 704 execute following the completion of execution of the Message Receiver block 736, assuming it executes. Execution of the second time-based portion 704 results in the generating and sending of a message that is received by the Message Generator block 732. If the second time-based portion 704 is configured as an atomic subsystem, then all of its blocks, including Gain block 722 and Outport block 724 will execute before the Message Generator block 732 executes. On the other hand, if the second time-based portion 704 is not configured as an atomic subsystem, then the Message Generator block 732 may execute before execution of the Gain block 722 and Outport block 724.

If the execution of the Message Generator block 732 results in the generation and sending of a message, then the Message Buffer block 734 may execute, as it is triggered by such a message. If the execution of the Message Buffer block 734 results in the generation and sending of a message, then the state-based portion 706 may execute again.

At this point, execution of the current time step may be complete. The model execution engine 208 may increment the time step and execute the model 700 again, unless the simulation end time has been reached.

Figure 10:
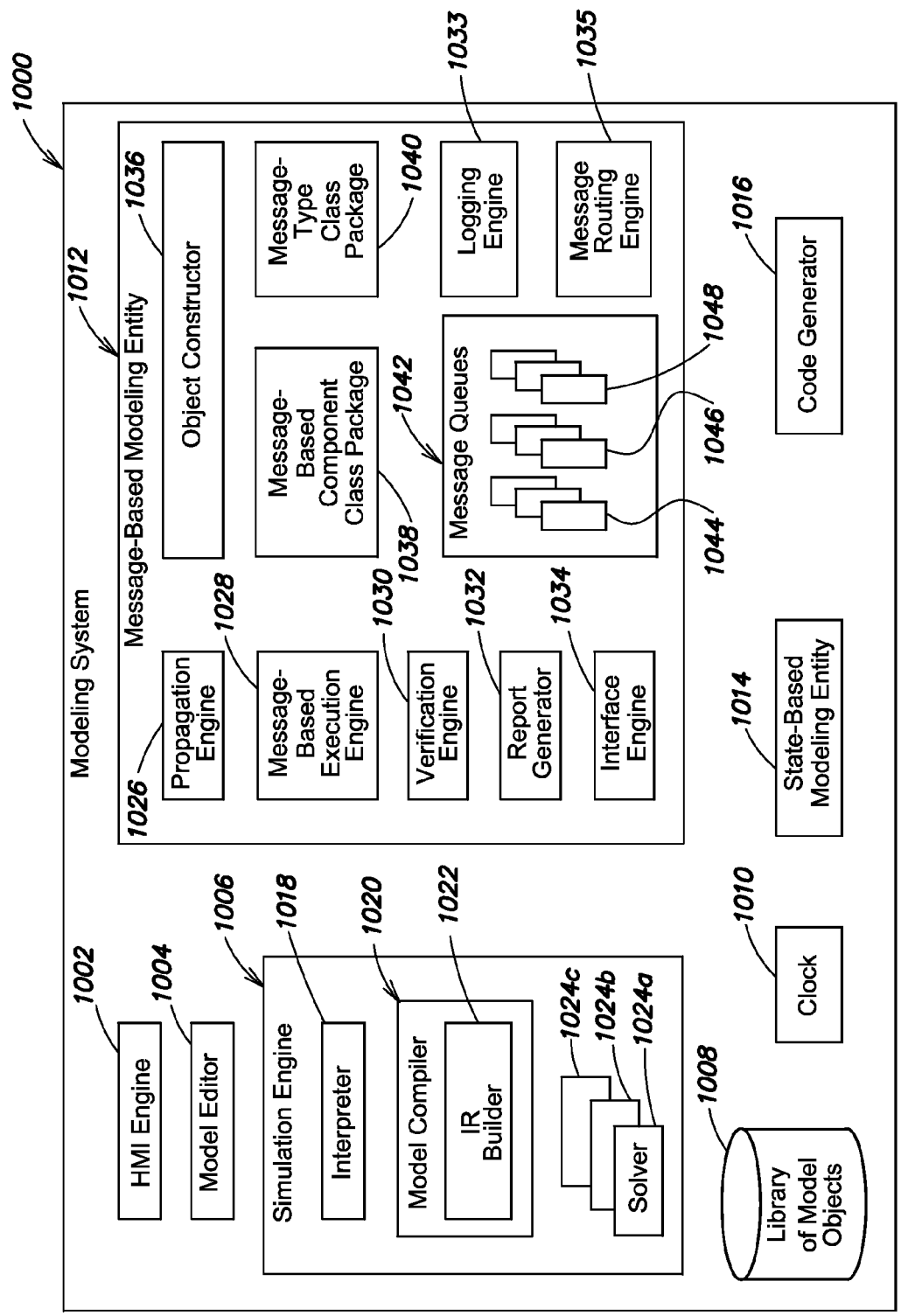
FIG. 10 is a schematic, functional diagram of a modeling environment system in accordance with an embodiment of the disclosure.

FIG. 10 is a schematic, functional diagram of a modeling system 1000 in accordance with an embodiment of the disclosure. The modeling system 1000 may include a plurality of components or modules. Specifically, the modeling system 1000 may include a human-machine interface (HMI) engine 1002, a model editor 1004, a simulation engine 1006, a library 1008 of model objects, a clock 1010, a message-based modeling entity 1012, a state-based modeling entity 1014, and a code generator 1016. The simulation engine 1006 may include an interpreter 1018, a model compiler 1020 that, in turn, may include one or more Intermediate Representation (IR) builders, such as IR builder 1022, and one or more, and preferably a plurality, of solvers, such as solvers 1024*a-c*. The HMI engine 1002 may be configured to create and present one or more User Interfaces (UIs), such as Graphical User Interfaces (GUIs), on a display screen of a workstation or other data processing device. The GUIs may be operated by users to initiate various model-related tasks, such as opening, creating, editing and saving models. The model editor 1004 may be configured to perform the selected operations, such as open, create, edit, and save, in response to the user inputs. The simulation engine 1006 may be configured to execute, e.g., compile and run or interpret, models or at least portions thereof, such as computer-generated simulation models, created or opened by the user, using one or more of the solvers 1024*a-c*. Exemplary solvers include one or more fixed-step continuous solvers, which may utilize integration techniques based on Euler's Method or Heun's Method, and one or more variable-step solvers, which may be based on the Runge-Kutta and Dormand-Prince pair. A non-exhaustive description of suitable solvers may be found in the *Simulink 7 User's Guide* from The MathWorks, Inc. (March 2014 ed.).

The library 1008 of model objects may include a plurality of predefined object types or classes, including time-based object types, state-based objects, and message-based object types, among others. Exemplary state-based objects or components include state charts, bubble charts, junctions, transitions, conditions, and flow graphs, among others. To create a model, a user may, among other operations, select a plurality of object types from the library 1008. In response, the modeling system 1000 may add instantiations of the selected objects to the model being constructed or edited.

The clock 1010 may be configured to generate one or more clock or time signals that may be used during execution of a model.

The message-based modeling entity 1012 may include a propagation engine 1026, a message-based execution engine 1028, a verification engine 1030, a report generator 1032, an interface engine 1034, a logging engine 1033, a message routing engine 1035, an object constructor 1036 that may access one or more class packages, such as message-based component class package 1038 and a message-type class package 1040. The message-based modeling entity 1012 also may include or have access to message queues as indicated at 1042.

The HMI engine 1002, model editor 1004, simulation engine 1006, message-based modeling entity 1012, state-based modeling entity 1014, and code generator 1016 may each comprise registers and combinational logic configured and arranged to produce sequential logic circuits. In an embodiment, the HMI engine 1002, model editor 1004, simulation engine 1006, message-based modeling entity 1012, state-based modeling entity 1014, and code generator 1016 are or include software modules or libraries containing program instructions pertaining to the methods described herein, that may be stored on computer readable media, and executable by one or more processors and/or processing elements. Other computer readable media may also be used to store and execute these program instructions. In alternative embodiments, various combinations of software and hardware, including firmware, may be utilized to implement embodiments of the disclosure.

The modeling system 1000 may receive inputs by a user as the user creates, edits, revises, and/or opens one or more models, such as computer models that, when executed, simulate the operation of systems, such as physical systems. A model may be specified graphically, textually, or a combination of graphically and textually, and may include a plurality of portions each operating according to a different execution domains. For example, a first portion may operate according to message-based semantics, a second portion may operate according to time-based semantics, and a third portion may operate according to state-based semantics. Other domains may include dataflow, control flow, and combined data and control flow domains. The time-based and/or the state-based portions may further operate in accordance with message-based semantics. The simulation engine 1006 in cooperation with the message-based execution engine 1028 may execute the model generating one or more results that may be presented to the user.

In an embodiment, the modeling system 1000, including the message-based modeling entity 1012, may be configured to implement a message-based modeling architecture in which producer/sender objects of a model generate messages that are received consumer/receiver objects during execution of the model. The model objects may be specified graphically, textually or a combination of graphically and textually. In an embodiment, messages may be instances of message types, and may include payloads comprising one or more data elements that may be fixed during execution of the model, for example a message's data does not change over the model's execution time. In an embodiment, a message payload value may be modified, e.g., during the message's time interval. Messages also may include one or more commands, such as operation codes (opcodes).

In an embodiment, a model or at least a portion thereof may represent a dynamic system that defines relationships between signals and state variables that change over time. Determining the behavior of a dynamic system may involve evaluating these relationships at a plurality of intervals, which may be called time steps, beginning at a start time and ending at a stop time. The process of solving a model at successive time steps may be referred to as simulating the system that the model represents.

In addition, sample times and sample rates may be determined, e.g., at model compilation stage, for at least some components of a model, such as one or more objects or blocks of the model. A block's sample time may be set explicitly by a user or programmatically, e.g., by setting a SampleTime parameter of the block, or it may be determined in an implicit manner based on the block's type and/or its context within the model. A block's SampleTime parameter may be a vector $[T_s, T_o]$ where $T_s$ is the sampling period and $T_o$ is the initial time offset. One or more of the solvers 1024 used to 'solve' the model may determine the size of the simulation time steps in order to execute the model, and these simulation time steps may be selected to correspond with the sample times of the blocks of the model. When a simulation time step matches the sample time for a block, a sample time hit occurs, and the block may be scheduled for execution during that simulation step.

The solver 1024 may generate an execution schedule for components, including objects or blocks, of the model over the course of the model's simulation time. In addition, one or more message-based components may be configured to execute at particular sample times. That is, the message-based components may be scheduled for execution at one or more time steps that correspond to sample time hits for the message-based components.

As noted, messages may persist for determined time intervals of an execution time of a model where the time interval is less than the full or entire execution time of the model. For example, a model may be or may include a time-based portion, and may execute over a simulation time that begins at a simulation start time and ends at a simulation end time. One or more of the solvers 1024 chosen to "solve" the model may determine the execution time steps for the model. The time-based portion of the model may produce signals that have a value throughout the execution time of the model, and the value may change dynamically during the model's execution. Messages, on the other hand, may persist for a discrete, limited portion of a model's simulation time. Messages may be configured to be triggering in which case, when a message is generated, a consumer/receiver object is activated, e.g., woken up, and run in order to process the message. The consumer/receiver object may process the message according to the object's normal execution schedule, e.g., as determined by the solver 1024. Alternatively, messages may be configured to be non-triggering in which case, while a consumer/receiver object may be woken up upon generation of a message, the consumer/receiver object is not required to process the message immediately. Instead, the consumer/receiver object, when activated, may examine a message queue to determine whether there is a message present in the queue, and if so may process, e.g., consume, the message. Activation of the consumer/receiver object may occur at some time after the message was generated and placed in the message queue. Messages also may be blocking or non-blocking. With a non-blocking message, a producer/sender may post a message, and then run to completion before a consumer/receiver of the message is activated, e.g., woken up. With a blocking message, the producer/sender object may be configured to enter a wait state upon posting a message, and execution may switch to the consumer/receiver object. Once execution of the consumer/receiver object completes, execution of the producer/sender may resume. In an embodiment, the message-based modeling entity 1012 may be configured such that messages are non-triggering and non-blocking. In this embodiment, if a producer/sender object wishes to receive an acknowledgement to a message, the producer/sender object may enter a wait state explicitly.

Message Queuing

As noted, the message-based modeling entity 1012 may establish one or more message queues 1042 configured to store messages generated by producer/sender objects of a model during execution of the model. The message queues 1042 may be accessed by consumer/receiver objects to retrieve messages stored therein. In particular, as part of a model initialization or set-up phase, the message-based modeling entity 1012 may request allocation of one or more data structures, e.g., in main memory 104 (FIG. 1), to establish the message queues 1042. Exemplary data structures include linked lists, circular queues, etc. Messages, or alternatively message payloads, generated by producer/sender objects of a model may be placed and stored in the message queues 1042.

In an embodiment, a producer/sender object may be configured to specify a particular one of the queues 1042 to store messages generated by the producer/sender object. One or more message queues, such as message queues 1044 may be global queues for storing messages generated by any message producer/sender object and intended for any consumer/receiver object. One or more other message queues, such as message queues 1046, may be local to one or more message-based objects, such as a producer/sender or consumer/receiver object. In addition, one or more message queues, such as message queues 1048, may be shared by a group of objects. For example, a group of consumer/receiver objects that are configured to receive certain messages during execution of the model, such as messages from the same producer/sender object, may share one of the shared message queues 1048.

Message queues 1042 may have a plurality of attributes or properties, such a length, a processing order, and an overflow policy, which may be specified through corresponding properties. The attributes or properties may be fixed or they may be settable, e.g., by a user, on a queue by queue basis. Exemplary lengths include 1, 2, 3, etc., such that the message queue may store one, two, three, etc. messages. Exemplary processing orders include First In First Out (FIFO), Last In Last Out (LIFO), and priority-based queuing, among others. An exemplary overflow policy is delete/replace oldest message if message queue is full when a new message is received/posted. With an overflow policy a producer/sender object may continue to send messages to the message queue. That is, the producer/sender object may not be blocked from sending further messages when a message queue is full.

In a further embodiment, at least some of the message queues 1042 may be configured with a priority attribute or property, and may thus be assigned priorities, such as a high priority message queue, a moderate priority queue, and a low priority message queue. A producer/sender object may designate one of the message queues 1042 to hold a given message. For example, for a message having high importance, the producer/sender object may designate the high priority message queue. For a message having moderate or low importance, the producer/sender object may designate the moderate or low priority message queues. A message receiver/consumer may be configured to process messages from a higher priority queue before processing messages from a lower priority queue irrespective of the chronological order, e.g., in terms of model execution time, of the messages in the two queues.

In an embodiment, the interface engine 1034 of the message-based modeling entity 1012 may be configured to provide, within an executable graphical model, one or more graphical objects, such as icons, blocks, etc., that represent a message queue. The message-based modeling entity 1012 may be configured to add one or more message queue objects to a graphical model automatically or in response to user action, such as selection and drag and drop operations.

Figure 19:
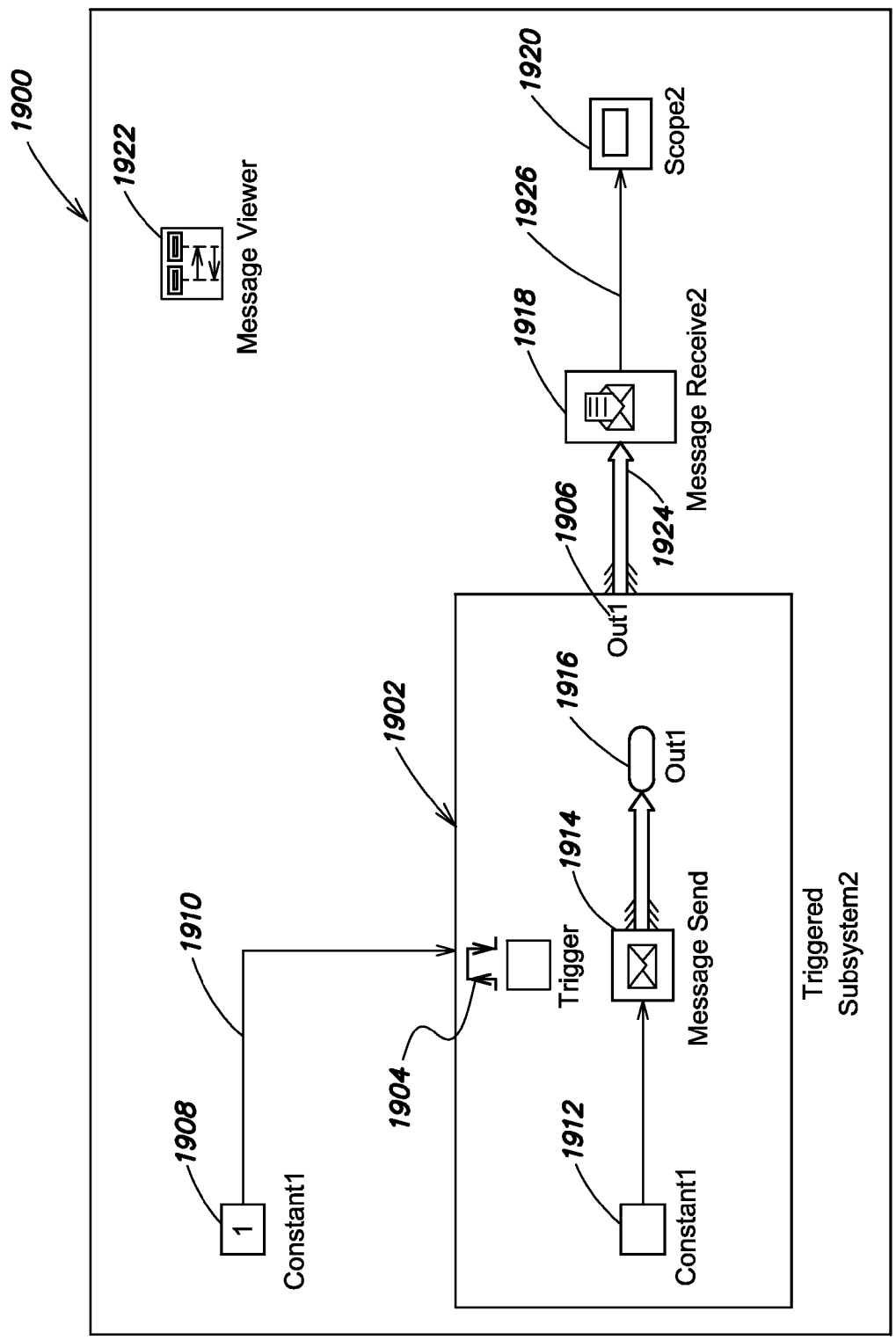
FIG. 19 is a schematic illustration of a graphical model having executable semantics in accordance with an embodiment of the disclosure.

FIG. 19 is a schematic illustration of a graphical model 1900 having executable semantics, which may be presented on a model editor window of a data processing device, such as a workstation, a laptop computer, a tablet computer, etc. The model 1900 may include a plurality of graphical objects, such as blocks, icons, etc. Specifically, the model 1900 may include a subsystem (Triggered Subsystem2) block 1902 having a trigger input 1904 and an output port (Out1) 1906. The model 1900 also may include a first constant block 1908 that is connected to the trigger input 1904 by a first single line arrow 1910. The subsystem block 1902 may represent a plurality of blocks, such as a second constant block 1912, a Message Send block 1914, and an outport (Out1) block 1916, which may correspond to the subsystem's output port 1906. The Message Send block 1914 may be configured to generate and send messages during execution of the graphical model 1900, and these messages may be provided to the subsystem's output port 1906 for receipt by other model objects or blocks. The model 1900 also may include a Message Receive block 1918, a Scope block 1920 and a Message Viewer block 1922. The Message Viewer block 1922 may be configured to present a message viewer window that may provide a trace of at least some of the messages generated during execution of the graphical model 1900.

The model 1900 may include a first double line arrow 1924 that connects the subsystem's output port 1906 to the Message Receive block 1918 to indicate that the Message Receive block 1918 is to receive the messages generated by the Message Send block 1914 of the subsystem 1902. A second single line arrow 1926 may connect the Message Receive block 1918 to the Scope block 1920. As noted, a first graphical affordance, e.g., a double line arrow, may be used to represent message connections among message send and receive blocks, while a second graphical affordance, e.g., a single line arrow, may be used to represent signals of the model 1900. In an embodiment, the message-based modeling entity 1012 may be configured to establish at least one message queue automatically in response to the Message Receive 1918 being added to the model 1900 and configured to receive messages from the subsystem 1902. During execution of the model 1900, messages generated and sent by the subsystem 1902 may be stored in this message queue for receipt and possibly consumption by the Message Receive block 1918.

Figure 20:
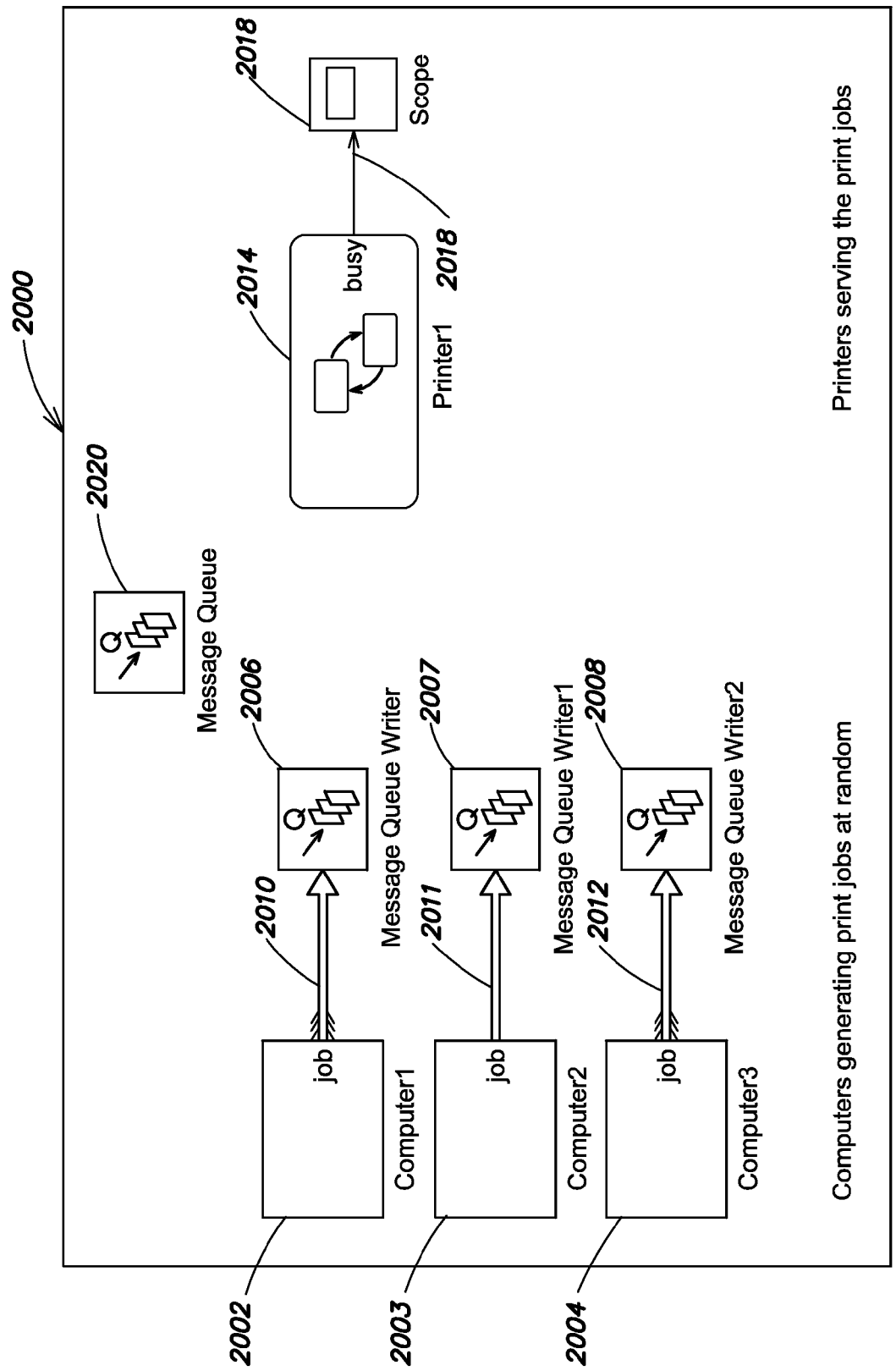
FIG. 20 is a schematic illustration of a graphical model having executable semantics in accordance with an embodiment of the disclosure.

FIG. 20 is a schematic illustration of another graphical model 2000 having executable semantics, which may be presented on a model editor window of a data processing device. The model 2000 may include a plurality of graphical objects, such as blocks, icons, etc. Specifically, the model 2000 may include first, second, and third subsystems 2002-2004, which are labeled 'Computer1', 'Computer2', and 'Computer3'. The first, second, and third subsystems 2002-2004 are configured to model computers that generate print jobs. The model 2000 also includes first, second, and third Message Queue Writer blocks 2006-2008, labeled 'Message Queue Writer', 'Message Queue Writer 1', and 'Message Queue Writer 2', that are configured to receive messages generated by the first, second, and third subsystems 2002-2004, respectively, as indicated by the first, second, and third double-lined arrows 2010-2012. The model 2000 also may include a state chart 2014 labeled 'Printed' that is coupled to a scope block 2016 by a single line arrow 2018 that represents a signal. Print jobs may be represented by messages generated by the first, second, and third subsystems 2002-2004 during execution of the model 2000. In addition, the state chart 2014 may be configured to receive these messages, and simulate the printing of these print jobs. In addition, one or more message queue blocks, such as message queue block 2020 may be included in the model 2000. The message queue block 2020 may represent a message queue configured to store the messages generated by the first, second, and third subsystems 2002-2004 pending receipt by the state chart 2014. As shown, the message queue block 2020 need not be connected to the first, second, and third subsystems 2002-2004 or the first, second, and third Message Queue Writer blocks 2006-2008, e.g., by an arrow, wire, or other graphical affordance. Nonetheless, the message queue represented by the message queue block 2020 may store messages generated by these blocks during execution of the model 2000. The message queue block 2020 thus represents a form of wireless queuing.

In an embodiment, a properties page may be associated with the message queue block 2020. The properties page may include a plurality of settable entries through which a user may specify attributes or properties of the message queue represented by the message queue block 2020, such as length, processing order, overflow policy, and priority, among others. The properties page may be opened in response to selection of the message queue block 2020.

Furthermore, instead of, or in addition to, having priority queues, one or more messages may be assigned a priority, e.g., by the producer/sender object of the message. The message-based execution engine 216 may be configured to sort messages within a message queue 1042 based on the priority of the messages. For example, messages assigned a high priority may be moved to the head of the queue, and may be removed and consumed before other messages in the queue that have a low or a lower priority.

Figure 11:
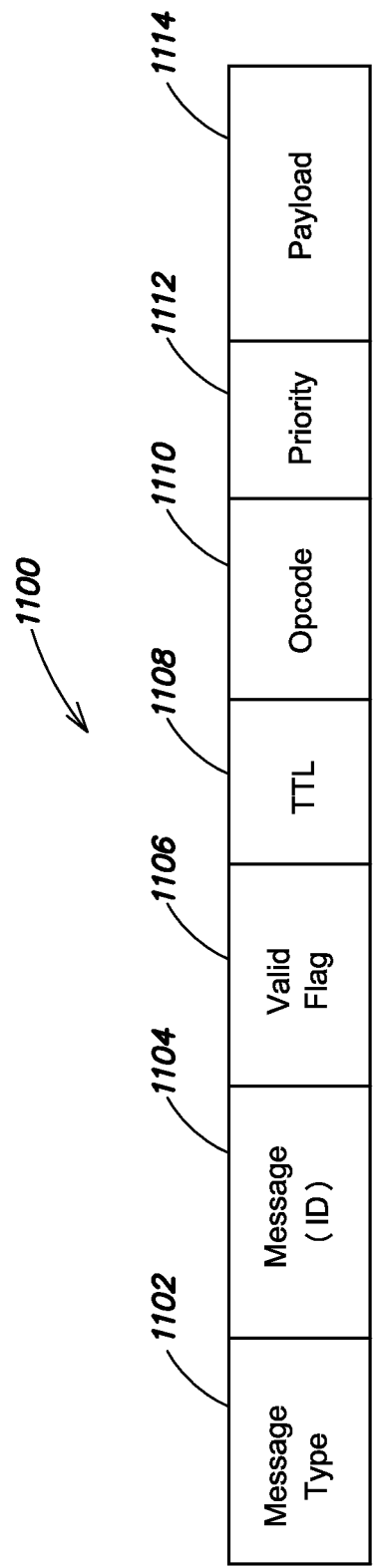
FIG. 11 is a schematic illustration of a data structure of a message in accordance with an embodiment of the disclosure.

FIG. 11 is a schematic illustration of a data structure 1100 for a message according to an embodiment. The data structure 1100, which may be created and/or allocated for an instance of a message object, may be organized into a plurality of fields and sub-fields each configured to store information. For example, the data structure 1100 may include a message type field 1102, a message identifier (ID) field 1104, a valid flag 1106, a time to live (TTL) field 1108, an operation code (opcode) field 1110, a priority field 1112, and a payload field 1114. The message type field 1102 may store information that indicates the particular type of message, the message ID field 1104 may store an identifier that uniquely identifies the message, the valid flag 1106 may indicate whether the message is valid or invalid, the TTL field 1108 may store information indicating how long the message should be maintained, the opcode field 1110 may store a value identifying a particular operation or command associated with the message, the priority field 1112 may store a value specifying the priority assigned to the message, and the payload field 1114 may store one or more data values or other information associated with the message as generated by the producer/sender object, which data values or other information may be processed, e.g., consumed, by one or more consumer/receiver objects.

Exemplary message opcodes may include WARNING, ERROR, DIAGNOSTIC, ALARM, and ALERT. Nonetheless, additional or other opcodes may be provided.

Synchronous/Asynchronous Execution

During execution of a model, a producer/sender object may generate and send a message to a consumer/receiver object of the model. The generation and/or sending of a message may occur at a sample time hit for the producer/sender object, or the generation and/or sending of a message may occur independently of the model's execution time steps. The message may be stored at a message queue 1042. As noted, a consumer/receiver object may be being triggered to execute upon the receipt of a message. That is, upon notification of a message being added to the queue, the consumer/receiver object may be activated and may retrieve and consume the message. The consumer/receiver object may thus operate synchronously relative to the receipt of a message. Alternatively, a consumer/receiver object may be configured to execute during one or more sample times, instead of being triggered by the receipt of a message. For example, at a sample time hit, the consumer/receiver object may examine its message queue to see whether there is a message in the queue. If there is a message in the queue, the consumer/receiver object may retrieve and consume the message as part of its execution during the sample time hit. At the next sample time hit, the consumer/receiver object may again access the message queue and, if one or more messages are found, may retrieve and consume the messages. The consumer/receiver object may thus execute asynchronously with respect to the reception of a message. During initialization of a model, the message-based execution engine 1028 may be configured to schedule message-based components or objects for synchronous or asynchronous execution. A message-based component or object may be configured to include a property or parameter whose setting specifies whether the component or object executes synchronously or asynchronously.

Using Messages within State-Based Modeling Components

In an embodiment, the library 1008 of model objects may include time-based and state-based objects or components that may be further configured to send and/or receive messages during execution of a model having instances of those objects or components. In particular, the simulation engine 1006 in cooperation with the message-based execution engine 1028 may be configured to execute state-based components or objects that send and/or receive messages during execution of a model or a portion thereof including those state-based components or objects.

A user may interact with a Graphical User Interface (GUI) to open, create, and/or revise a model, including a state-based model. Specifically, the HMI engine 1002 may be configured to provide a model editor window in the form of a GUI having a plurality of window gadgets (widgets) or graphical elements, which may be arranged as a desktop environment. The GUI's graphical elements may include a model canvas and one or more floating palettes that present graphical object types, such as component types, from the library 1008 that may be selected, e.g., by a user, and used to construct a desired model on the model canvas.

Figure 12:
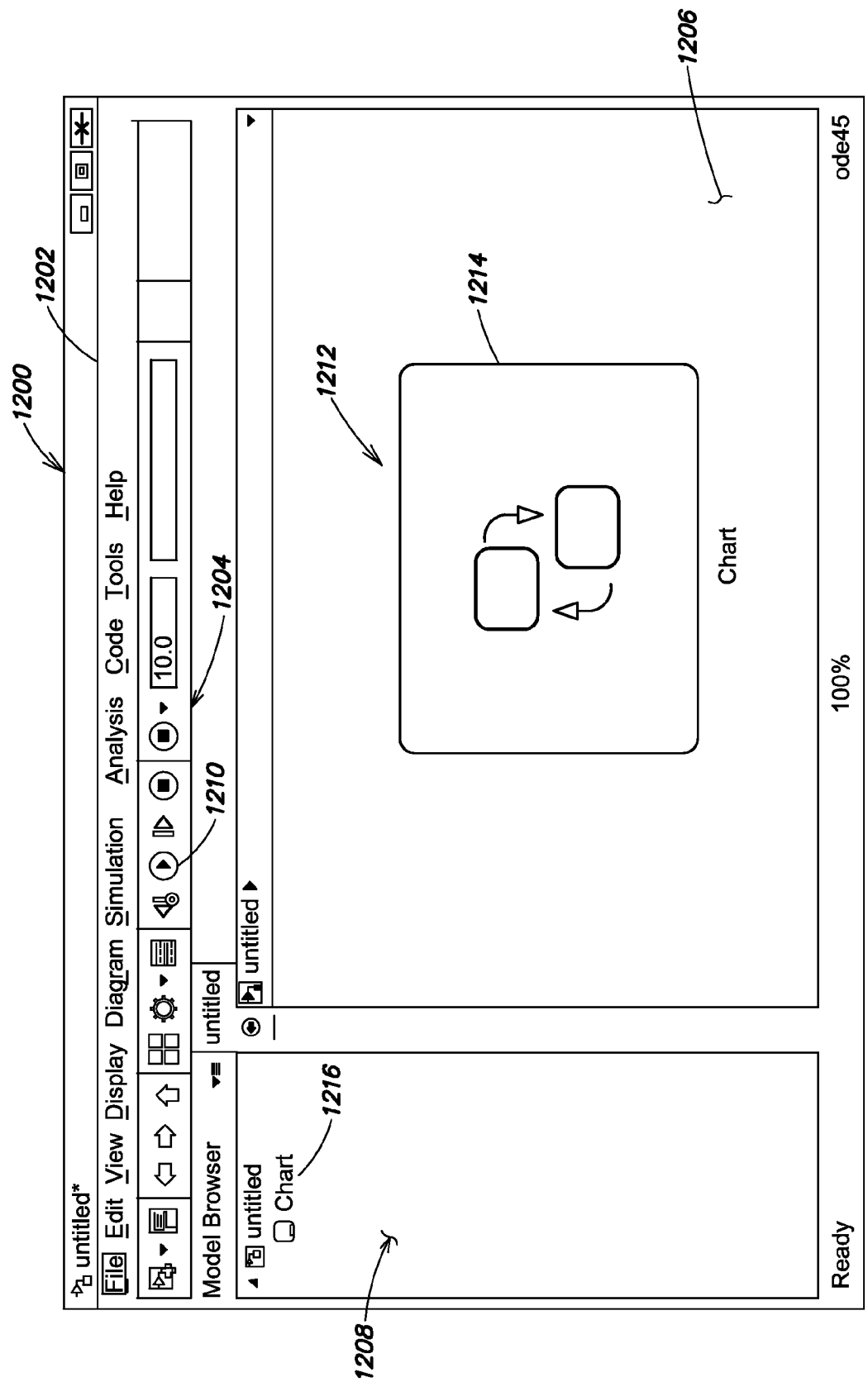
FIG. 12 is a schematic illustration of a model editor in accordance with an embodiment of the disclosure.

FIG. 12 is a schematic illustration of a model editor window 1200. It may have a menu bar 1202, a toolbar 1204, a canvas 1206, and a model browser 1208, among other graphical elements. The menu bar 1202 may include a plurality of text-based command types, such as File, Edit, View, Display, etc., that may have a plurality of text-based commands. A user may open, create, edit, and save a model presented in the canvas 1206, for example using commands and sub-commands available through the menu bar 1202. The toolbar 1204 may include a plurality of graphical command buttons, such as a Run button 1210, among others. In response to a user selecting the Run button 1210, the modeling system 1000 may run, e.g., execute, a model opened in the model editor window 1200. A user may select object types from a palette (not shown) and add instances of the selected objects to the canvas 1206 to construct or revise a model 1212. At least some of the selected objects may be graphical objects. The model 1212 may have portions operating according to different execution domains, such as a time-based portion, a state-based portion, a dataflow based portion, a control flow portion, etc. The model 1212 may include a graphical state-based component, such as a chart 1214. The model browser 1208 may provide a project tree view 1216 of the model 1212 opened and presented on the canvas 1206.

In an embodiment, the modeling system 1000 may be configured to execute state-based components or objects in response to events or messages occurring during model execution. Furthermore, the modeling system 1000 may be configured to utilize a plurality of execution stages for state-based components or objects. For example, a state-based component may have an inactive execution stage in which the component has no active states, an active execution stage in which the component has one or more active states, and a sleeping execution stage in which the component has one or more active states but no events or messages to process.

Input/Output Messages

Figure 13:
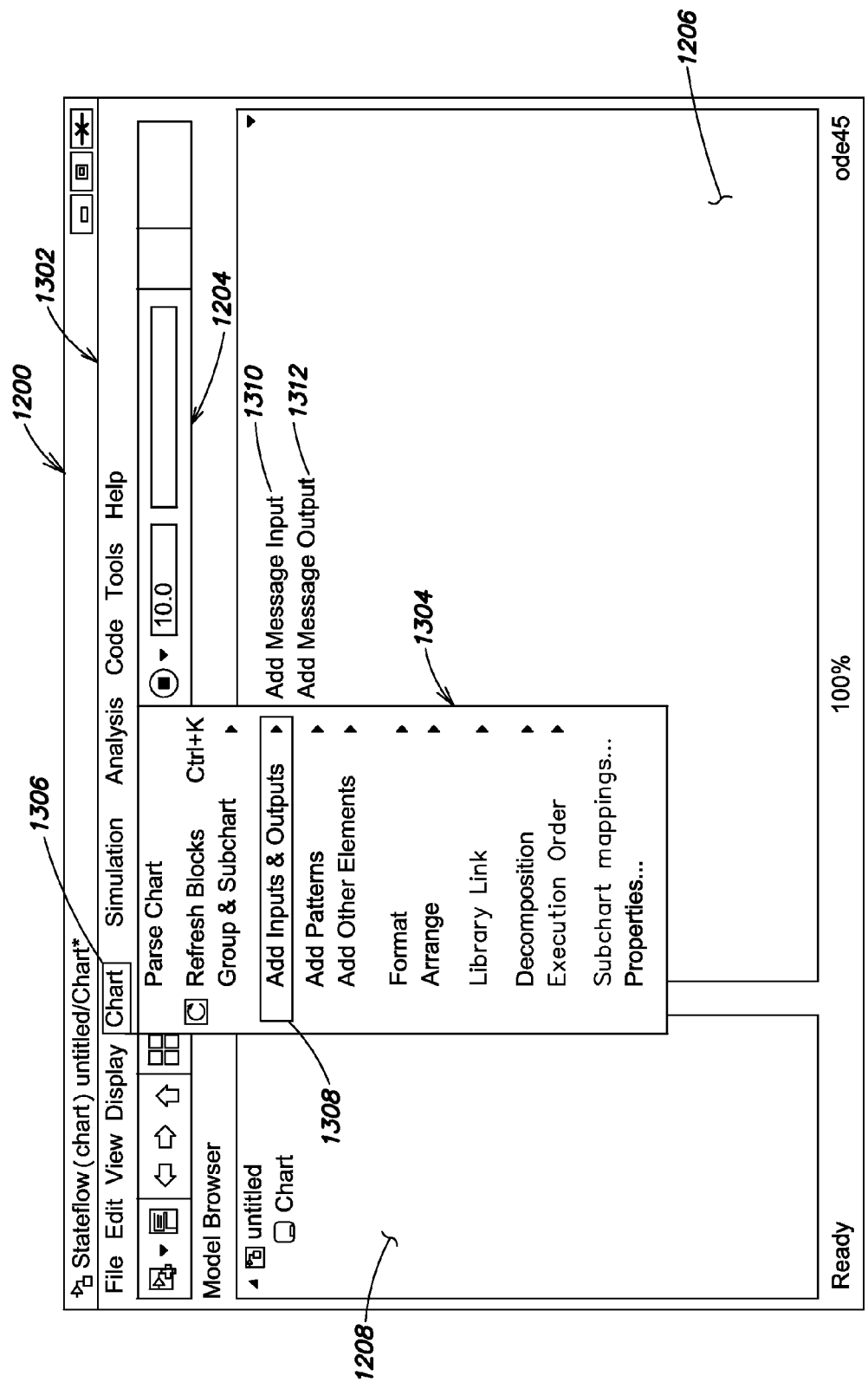
FIG. 13 is a schematic illustration of a model editor in accordance with an embodiment of the disclosure.

In an embodiment, the message-based modeling entity 1012 may be configured to add one or more message ports to a state-based component of a model, such as the chart 1214 of the model 1212. The message ports may be represented graphically, and may be added in response to user inputs or programmatically. The modeling system 1000 may be configured to open the chart 1214, e.g., for editing, in response to a selection of the chart 1214, e.g., by a user. FIG. 13 is a schematic illustration of the model editor window 1200 in which the chart 1214 is opened. With the chart component 1214 opened, a user may construct or revise the chart component 1214, for example, by adding program elements or components to the canvas 1206. A menu bar 1302 for the chart 1214 may be presented on the model editor window 1200 in place of the menu bar 1202 (FIG. 12). A popup dialog 1304 may be presented in response to a selection of a Chart command 1306 of the menu bar 1302. The popup dialog 1304 may include an Add Inputs & Outputs command 1308 that, in turn, may present a plurality of commands, such as an Add Message Input command 1310 and an Add Message Output command 1312. The message-based modeling entity 1012 may be configured to add message ports to state-based objects, such as the chart component 1214, for example, in response to the selection of the Add Message Input command 1310 and/or the Add Message Output command 1312, e.g., by a user. In an embodiment, a properties page (not shown) may be presented in response to the selection of the Add Message Input command 1310 and/or the Add Message Output command 1312 through which a user may specify property values for the respective message ports. A message input port may have the following properties:

1. data type of message payload;
2. Queue size; and
3. Consume message on peek (yes/no).

A message output port may have the following properties:
1. data type of message payload; and
2. block on send (yes/no).

Nonetheless, additional or other properties may be provided.

The message-based modeling entity 1012 may be configured to assign default values to one or more of the properties of the message ports. The message-based modeling entity 1012 may be configured to implement message ports as objects instantiated from a message port class or type.

Figure 14:
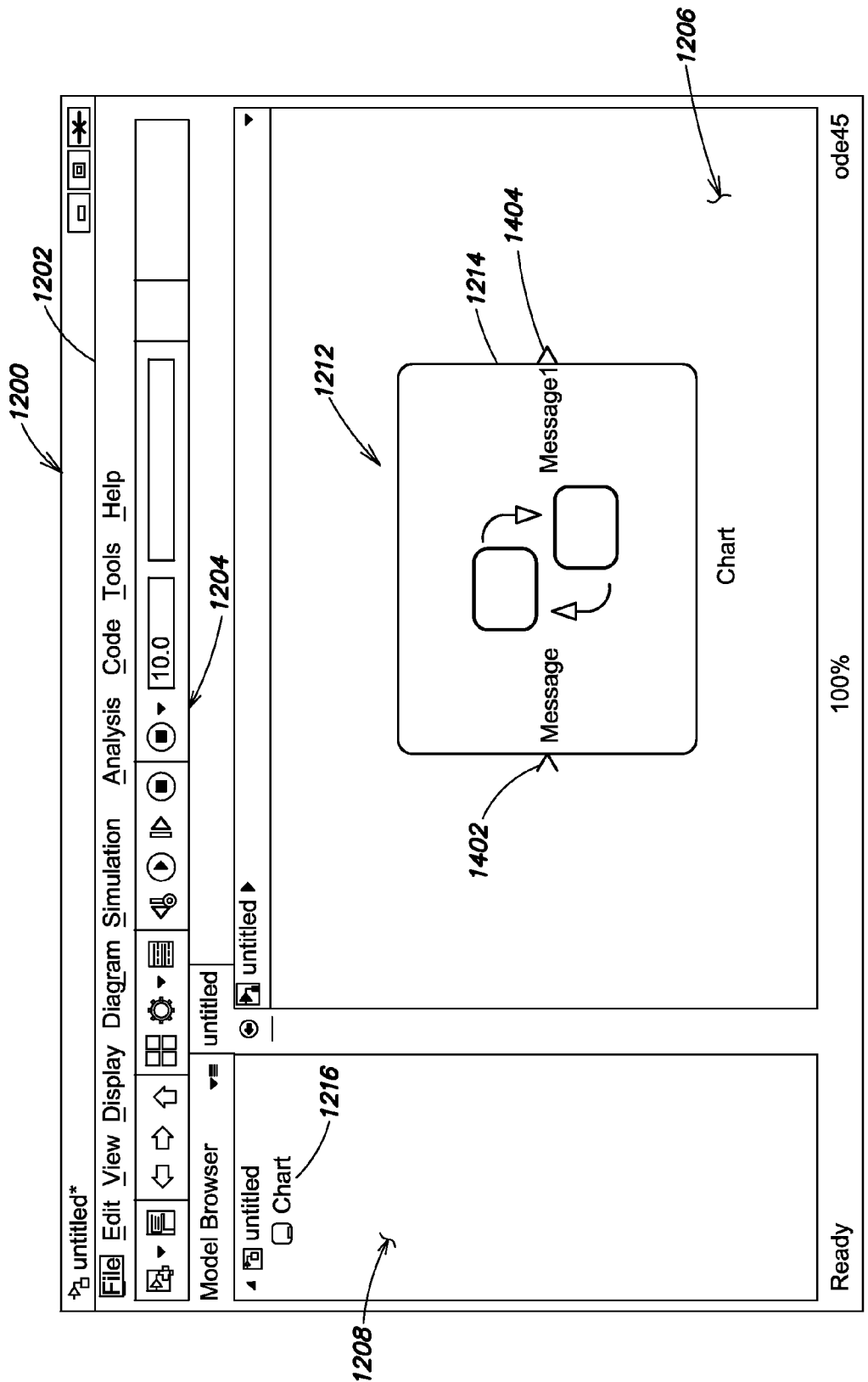
FIG. 14 is a schematic illustration of a model editor in accordance with an embodiment of the disclosure.

Once desired values have been selected for the properties of the message ports, the user may return to the model view. FIG. 14 is a schematic illustration of the model editor window 1200. The chart component 1214 now includes a message input port, named 'Message', 1402, and a message output port, named 'Message1', 1404. In an embodiment, particular messages may be assigned to the message input and output ports 1402 and 1404 graphically, e.g., by drawing a line or other graphical object from another component or object of the model to the message input and output ports 1402 and 1404. Alternatively, messages may be assigned to the message input and output ports 1402 and 1404 through textually specified commands or through a combination of textual and graphical inputs.

In an embodiment, the message-based modeling entity 1012 may be configured to assign respective message queues 1042 to the message ports, such as the message input and output ports 1402 and 1404. The message queues 1042 assigned to the input and output ports 1402 and 1404 may have a length, a processing order, an overflow policy, and a priority.

It should be understood that the message-based modeling entity 1012 may be configured to utilize other objects to implement message ports and/or message queues. For example, a separate graphical object, such as a Message Queue block, may be defined, and instances of the Message Queue block may be added to a model. A Message Queue block may be associated with a message port of a state-based component. For example, a Message Queue block may be graphically or visually connected to the message port.

Logging and Message Tracing

In an embodiment, the logging engine 1033 may be configured to log messages generated during execution of a model. For example, the logging engine 1033 may be configured to utilize one or more blocks or objects for logging message. The blocks or objects may be included in the model, and may be configured to detect messages as they are added to a message, and to store copies of the messages for subsequent analysis. In addition to storing copies of the message, the blocks or objects may be configured to store additional data, such as metadata, associated with the messages. The metadata may include such things as the execution time at which messages are created and added to the queue, the execution time at which messages are de-queued, the producer/sender of a message, the receiver/consumer of a message, etc. Exemplary blocks or objects that may be used by the logging engine 1033 include the 'To Workspace' block of the Simulink model-based design system from The MathWorks, Inc. The 'To Workspace' block may, for example, be connected to a message port and/or a Message Queue block. During execution, the 'To Workspace' block may store information concerning messages in a workspace associated with the model. Following the execution of the model, a user may access the workspace, and examine the messages and their metadata.

Message Routing and Forwarding

In an embodiment, the message routing engine 1035 may be configured to route messages within a model. For example, the message routing engine 1035 may be configured to forward messages received at a first message queue to a second message queue. The message routing engine 1035 may call a forward method or operation on the queue. The forward method or operation may specify the second message queue to which messages are to be forwarded. In an embodiment, the forward method or operation may not cause messages to be consumed, e.g., deleted from the first queue. To the extent the first message queue is associated with a state-based component or object of a model, the message routing engine 1035 may be configured to forward messages from the first message queue when the component or object goes to sleep. In an alternative embodiment, the forwarding of messages from the first queue may result in the messages being consumed.

In an embodiment, one or more graphical object types may be specified, and instances of these graphical object types may be included in a graphical model to specify message routing functions or operations. The graphical objects may be represented in a graphical model by preselected graphical affordances, such as particular blocks, icons, etc.

Figure 21:
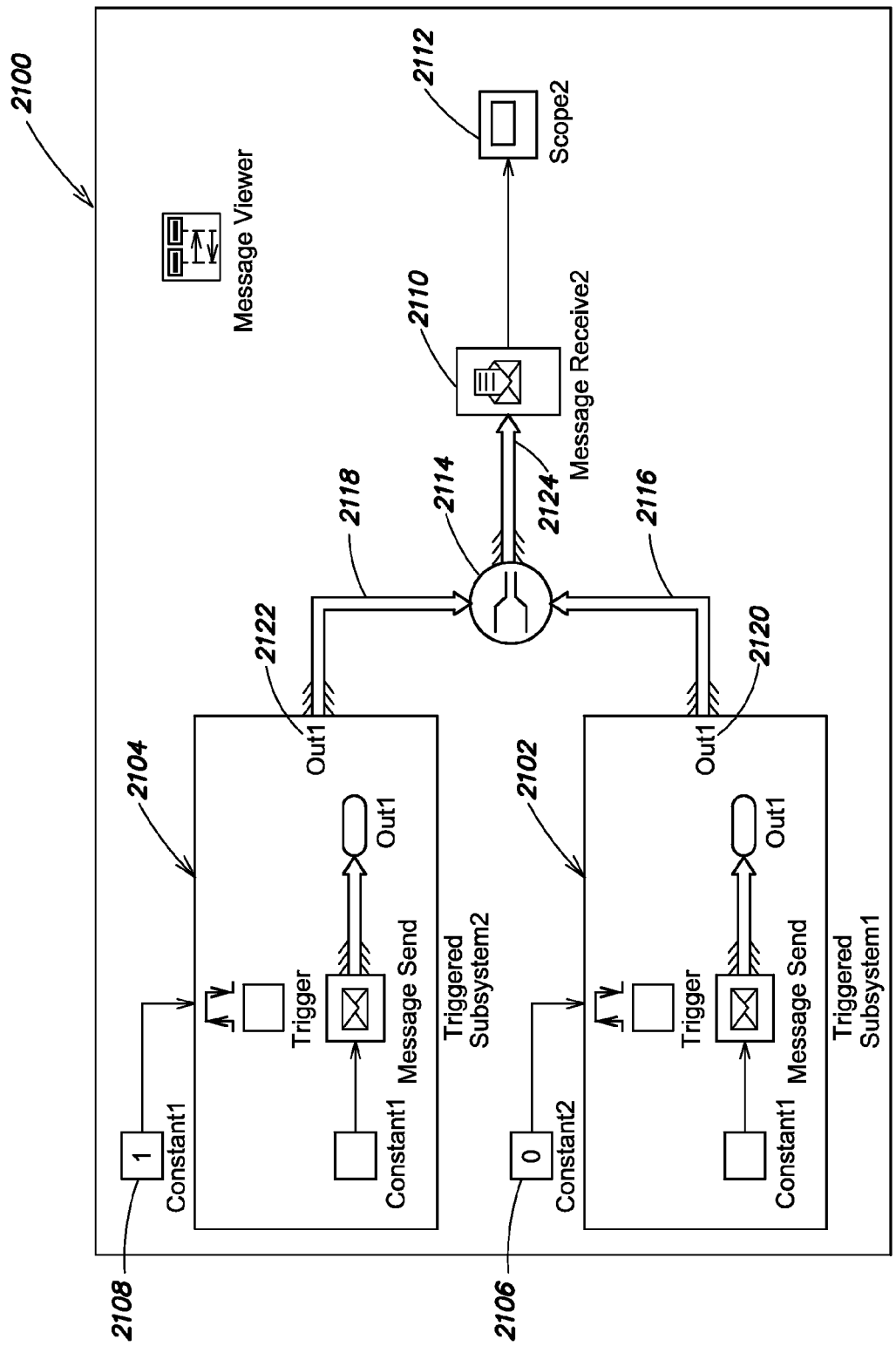
FIG. 21 is a schematic illustration of a graphical model having executable semantics in accordance with an embodiment of the disclosure.

FIG. 21 is a schematic illustration of a graphical model 2100 having executable semantics. The graphical model 2100 may include a plurality of model elements. Specifically, the model 2100 may include first and second triggered subsystems 2102 and 2104 labeled 'Triggered Subsystem1' and 'Triggered Subsystem2'. The model 2100 also may include first and second constant blocks 2106 and 2108, labeled 'Constant 2' and 'Constant 1', configured to trigger the execution of the first and second triggered subsystems 2102 and 2104. The first and second triggered subsystems 2102 and 2104 may be configured to generate and send messages during execution of the graphical model 2100. The model 2100 also may include a Message Receive block 2110, labeled 'Message Receive2', and a scope block 2112, labeled 'Scope2'. The model 2100 may be configured such that the Message Receive block 2110 receives messages from both the first and second triggered subsystems 2102 and 2104. For example, a special routing block, such as a message path combiner block 2114 may be included in the model, and the message path combiner block 2114 may be arranged within the model 2100 to indicate that the Message Receive block 2110 receives messages from both the first and second triggered subsystems 2102 and 2104. More specifically, first and second message arrows 2116 and 2118 may connect the message path combiner block 2114 to message output ports 2120 and 2122 of the first and second triggered subsystems 2102 and 2104. Additionally, a third message arrow 2124 may connect the message path combiner block 2114 to the Message Receive block 2110.

It should be understood that other or different message routing blocks may be provided, such as a message splitter block configured to distribute messages from one message source block to multiple message receiver blocks.

Message Queue Primitives

Message queues may be configured by the message-based modeling entity 1012 to implement a plurality of methods or operations, such as primitive operations or primitives, during execution of a model. For example, message queues may support a 'peek' method or operation. In response to calling the 'peek' method, a message queue may reply by informing the caller or sender of the 'peek' method whether or not a message is currently in the queue. The reply may simply indicate whether one or more messages are in the message queue, e.g., Yes or No. Alternatively, the reply may include the number of messages in the queue. In addition, the caller of the 'peek' method may obtain the message's payload. In an embodiment, the 'peek' method or operation may not result in the message being removed from the message queue. Accordingly, the number of messages currently stored in a message queue is not changed by the 'peek' method. A message queue may also support a 'pop' method or operation. A message queue may respond to a 'pop' method or operation by removing a message from the message queue, and providing the message to the caller of the 'pop' method or operation. The particular message that is removed may depend on the queue's processing order, e.g., FIFO, LIFO, etc. A message queue also may support a 'consume' method or operation. In response to a 'consume' method or operation, the message queue may destroy the respective message. In an embodiment, multiple methods or operations may be tied together. For example, the 'consume' method may be tied to the 'pop' method so that, when a message is removed from a message queue it is also destroyed.

Posting Messages from State-Based Components

The modeling system 1000, including the state-based modeling entity 1014, may be configured to execute actions defined or specified for state-based components or objects during model execution. More specifically, a user may define or specify, one or more action statements for state objects of a model. For example, an entry type of action, which may be identified by using a label, such as 'entry' or 'en', may be executed when a state becomes active, e.g., is entered. A during type of action, which may be identified by using a label, such as 'during' or 'du', may be executed while a state is active. In an embodiment, the modeling system 1000 may be configured to support the specification of during actions to be performed or executed when a specified event occurs, or when a specified message and/or message payload is received. An exit type of action, which may be identified by using a label, such as 'exit' or 'ex', may be executed when a state becomes inactive, e.g., is exited. An on event type of action, which may be identified by using a label, such as 'on', followed by an event name, may be executed when the state is active and the event occurs. In an embodiment, the modeling system 1000 may be configured to support the specification of actions to be performed when a state is active and a particular message is received by the state. That is, the modeling system 1000 may also support an on message type of action, which may also be identified by the 'on' label.

The modeling system 1000, including the message-based modeling entity 1012, may be configured to implement a programming syntax that may be used when defining or creating a model in order to configure a state-based component or object of the model to post a message during execution of the model. An exemplary textual syntax is:

post(Message_Name, payload)
where
'post' is the name of the operation or command for posting a message,
'Message_Name' is the name of the message to be posted, and
'payload' is the value of the payload of the message to be posed.

Using the defined syntax, a user may configure a state-based component or object of a model to post one or more messages during execution of the model including that state-based component or object. The posting of the message may be specified as an entry type of action, a during type of action, a on type of action, or an exit type of action. The one or more messages may be posted by the component or object to a particular message queue.

Figure 15:
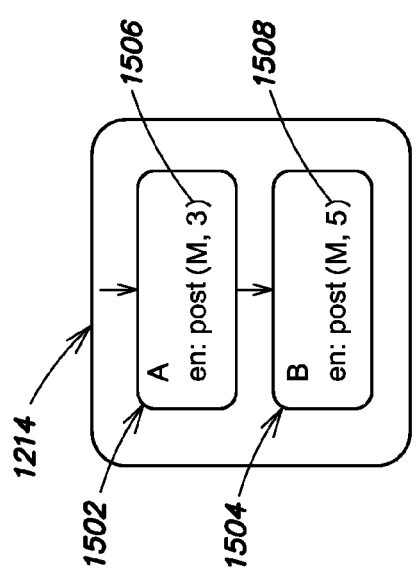
FIG. 15 is a schematic illustration of a state-based component of an executable model in accordance with an embodiment of the disclosure.

FIG. 15 is a schematic illustration of the state-based component 1214, which has been configured to include a first state, named 'A', 1502, and a second state, named 'B', 1504. State A 1502 includes a text command, 'en: post(M, 3)', 1506, while state B 1504 includes a text command, 'en: post(M, 5)', 1508. During execution of a model that includes the state-based component 1214, when state A 1502 is entered, the message-based execution engine 1028 posts a message M with a payload of '3' on the message queue associated with the message output port 1204. When state B 1504 is entered, the message-based execution engine 1028 posts a message M with a payload of '5' on the message queue associated with the message output port 1404.

It should be understood that other programming syntaxes may be defined and used to post messages. For example, other exemplary programming syntaxes include:

M.data = 3; post(M), and
M = 3; post(M).

Using Messages to Control Transitions Among States

In an embodiment, the modeling system 1000 may be configured to support transitions among state components or objects of a model based on messages generated during execution of the model. That is, the transitions may occur (or may not occur) as a function of one or more messages. In other words, a state transition may be "guarded" by a message. In particular, the message-based modeling entity 1012 may be configured to implement transitions between states:

1. when any message is received;
2. when a particular message is received;
3. when any message that satisfies some condition is received; and
4. when a particular message that satisfies some condition is received.

The message-based modeling entity 1012 may be configured to recognize a programming syntax, and this programming syntax may be used to associate a message or a message and condition to a transition. An exemplary textual syntax is:

'Message_Name'('payload_name') ['payload_name' = = 'value']
where
'Message_Name' identifies the message,
'payload name', if present, identifies an element of the message's payload, and 'value' specifies a value for the identified payload element.

Figure 16:
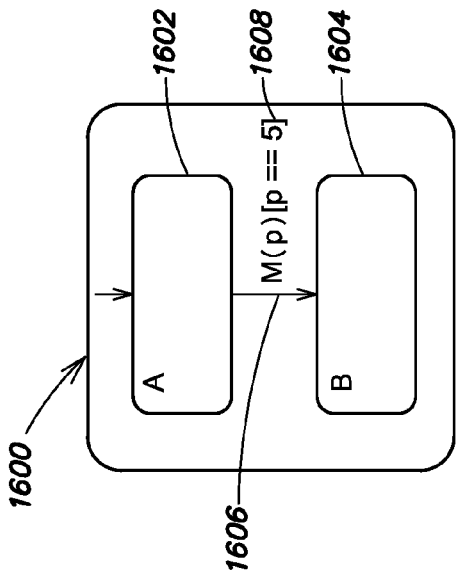
FIG. 16 is a schematic illustration of a state-based component of an executable model in accordance with an embodiment of the disclosure.

FIG. 16 is a schematic illustration of a graphical state-based component 1600 having a first state, named A, 1602, a second state, named B, 1604, and a state transition 1606 from state A 1602 to state B 1604. The state transition 1606 is guarded by, e.g., conditioned on, the existence of a message. More specifically, the state transition 1606 is associated with a textual string, 'M(p)[p==5]', 1608. During execution of a model containing the state-based component 1600, the message-based modeling entity 1012 may evaluate the textual string 1608. Evaluation of the textual string 1608 may cause the message-based modeling entity 1012 to determine whether an input message queue of the state-based component 1600 has a message M whose payload has a value of '5'. If so, the message-based modeling entity 1012 removes the message M from the message queue, transitions the component 1600 from state A 1602 to state B 1604, and consumes the message M.

A state-based component or object may be configured to transition between states on receipt of a message, regardless of the message's payload. For example, to configure the state-based component 1600 to transition from state A 1602 to state B 1604 on receipt of a message, regardless of the message's payload, a user may associate the transition 1606 with the textual string 'M'. The message-based modeling entity 1012 may be configured to evaluate this textual string to mean: determine whether any message 'M' is received, without considering the message's payload.

In an embodiment, a textual command string may be associated with a transition by selecting the transition, and entering the textual command string in a dialog that opens for the transition.

It should be understood that other programming syntaxes may be used to determine if a desired message exists to cause a transition among states. Alternative syntaxes that may be used include:

```
'Message_name'['Message_name' = = 'payload_value']
rcv('Message_name')['Message_name' = = 'payload_value']
```

State-based components or objects may also be configured to receive messages, and process the payloads of messages as during and exit types of actions.

Figure 17:
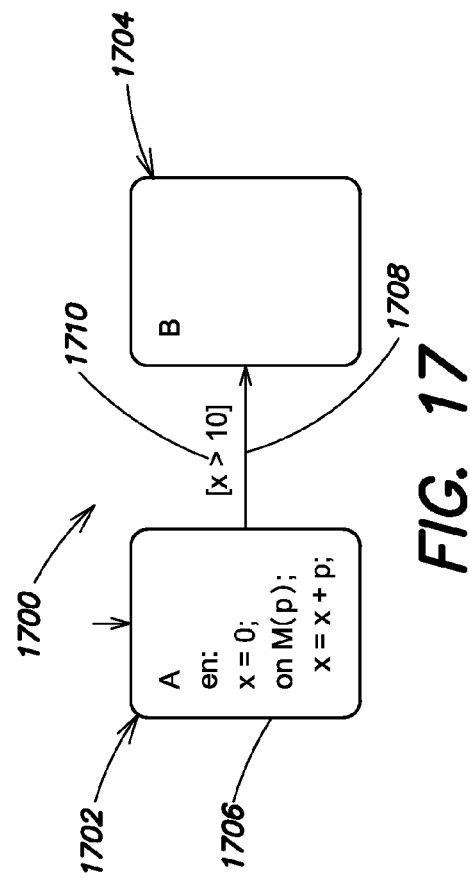
FIG. 17 is a schematic illustration of a state-based portion of an executable model in accordance with an embodiment of the disclosure.

FIG. 17 is a schematic illustration of a graphical state-based model portion 1700 having a first state 1702 named 'A', and a second state 1704 named 'B'. The first state 1702 has been configured with a first code element 1706 that is executed when the state is entered (en). A transition 1708 has been specified between the first and second states 1702 and 1704, and the transition 1708 is guarded with a second code element 1710. After setting a variable 'x' to '0', execution of the first code element 1706 determines whether a message 'M' having a payload 'p' has been received by the first state 1702. If so, the value of the payload 'p' is added to the variable 'x'. The new value of the variable 'x' is then used to determine whether to transition from the first state 1702 to the second state 1704.

State transitions may also be guarded by attributes of message queues, such as the length of a given message queue.

Determining when Messages are Posted

The simulation engine 1006 may be configured to execute a model over a simulation time that has a plurality of time steps, including a model having components or objects that send and receive messages. The modeling system 1000 may be configured to support a programming syntax for determining whether a message is received at a given point in time during the simulation time, such as a particular time step and/or a particular simulation time. For example, the modeling system 1000 may support the following programming syntax, which may be used in a model:

```
Message_name [t = = model_execution_time_point]
where
   'Message_name' is the name of the message,
   't' refers to the model's simulation time, and
   'model_execution_time_point' is the time value to be evaluated
with respect to the specified message.
```

This programming syntax may be used to guard transitions among states or to determine whether other operations should be performed, e.g., by a state-based or other component or object of a model.

Message Consumption

In an embodiment, the message-based modeling entity 1012 may be configured to designate messages as consumed upon the messages being read. Once a message is designated as consumed, it may be marked stale and/or destroyed. Suppose, for example, that a transition between two states is defined to occur on the existence of a message having an attribute that satisfies some condition, such as a payload equaling some value, a payload being greater or less than some value, the message is received at a particular point in the model execution time, etc. If the message-based modeling entity 1012 examines the message queue and finds a message in the queue, then the message-based modeling entity 1012 may read the message and mark it as consumed whether or not the message's attribute satisfies the condition. Thus, even though a message does not result in a transition between the two states because the message's attribute does not meet the condition, the message may be consumed, and thus destroyed.

With regard to state-based components or objects, the message-based modeling entity 1012 may be configured to mark a message as read after the state-based component reaches a stable state. Suppose, for example, that a state-based component is defined so that the component transitions from a first state to a second state upon receipt of a message, regardless of the message's payload, and transitions from the second to a third state if an attribute of a received message satisfies some condition. In this case, upon receipt of a first message, the component transitions from the first state to the second state. The first message is also tested to see whether its attribute satisfies the condition. If so, the component transitions from the second to the third state. If the third state is a stable state of the component, then the message-based component marks the message as consumed, and the message is destroyed. Nonetheless, the same message may be used to effect two transitions within the state-based component.

A state diagram or state chart may be considered to be in a stable state after all possible transitions among states or sub-states are completed. Alternatively, the message-based modeling entity 1012 may be configured to treat a message as consumed after the first access to the message, e.g., after accessing the message in response to a first transition of a state-based component or object.

In an embodiment, before a message-based component goes to sleep, messages that were peeked at may be popped and thus consumed.

In an embodiment, the state-based modeling entity 1012, e.g., as default semantics, may be configured to execute the state-based components of a model once for every active input event or input message to the state-based components. If there are no input events or input messages for a given state-based component, it may be executed once each time step, if the model is a time-based model that executes over a plurality of time steps between a start time and an end time. In addition, a given state-based component or object of a model may be configured to execute multiple times for every active input event or input message, or for every time step when the state-based component has no input events or input messages. In this case, which may be referred to as 'super step' semantics, the given state-based component may take valid transitions until no more valid transitions exist for the given state-based component, or the number of transitions that have been taken exceeds a threshold, which may be user specified. For a state-based component configured with 'super step' semantics, the message-based modeling entity 1012 may be configured to mark a message as read (and thus consumed) at the end of each single step, or alternatively at the end of a 'super step'.

In an embodiment, the state-based modeling entity 1014 may support the creation of state-based components that include parallel (AND) states or sub-states in which all the states or sub-states of the state-based component are active. The ordering of parallel states or sub-states may be explicit, e.g., user-specified priority numbers, or implicit, e.g., based on internal rules of the state-based modeling entity 1014.

Suppose, for example, a state-based component has a single message input port and two parallel states that are both interested in messages posted to the component's message input port. In an embodiment, when a message is received at the message input port, the message-based modeling entity 1014 may be configured to wait until each parallel state or sub-state has had an opportunity to read the message before marking the message as consumed. If a first parallel state is ready for a message, the message is read and acted upon by the first parallel state. If a second parallel state is not ready for a message, then it does not read the message, and the message may be considered consumed.

In an alternative embodiment, the message-based modeling entity 1012 may be configured to establish a message queue for each parallel state or sub-state, and to place a copy of the message in each of these message queues. In this embodiment, if a first parallel state is ready for a message, it reads the message from its message queue and the message from that message queue is consumed. If a second parallel state is not ready for a message, the message waits in the second parallel state's message queue until the second parallel state is ready to read a message.

In yet another embodiment, the message-based modeling entity 1012 may be configured to keep executing the parallel states until a fixed point is reach at which a message may be consumed by both of the parallel states, e.g., in the same time step.

Verification of a Message-Based Portion of a Model

In a further aspect of the disclosure, verification or other testing may be performed on one or more message-based portions of a model. In an embodiment, one or more verification components may be provided to verify a message-based portion of a model.

Message Observer

In an embodiment, the verification engine 218 may create a first verification component, which may be referred to as an observer, for verifying one or more messages in a model. The observer may be associated with a particular message-based connection in a model, and may present information concerning one or more of the messages that travel across that connection during execution of the model. In an embodiment, the observer component operates, at least in part, as a viewer to present information concerning all of the messages that travel across the selected connection during execution of the model. The observer component may provide a message-based view that includes the set of message participants, such as the sources and destinations, the types of messages generated and sent, and the payloads of those message. This collection of information may be referred to as an interaction.

Figure 8:
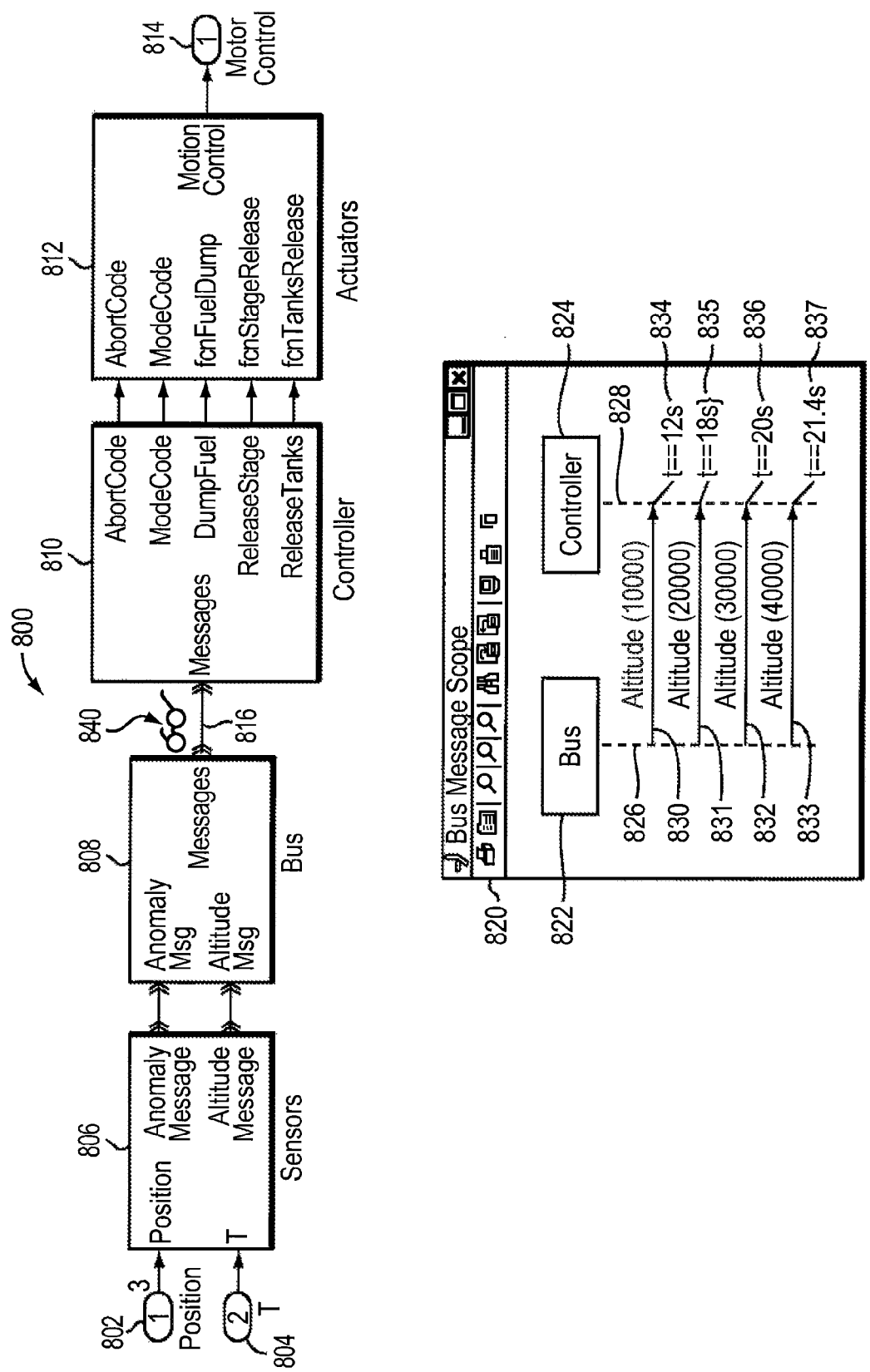
FIG. 8 is an illustration of a graphical model having executable semantics in accordance with an embodiment of the disclosure.

FIG. 8 is a schematic illustration of a graphical model 800 having executable semantics. The model 800 includes a plurality of interconnected components. Specifically, the model 800 has two Inports 802, 804, a Sensors component 806, a Bus component 808, a Controller component 810, an Actuators component 812, and an Outport 814. The Inports 802, 804 and the Outport 814 may be time-based components, while the Sensors, Bus, Controller, and Actuators components 806, 808, 810, 812 may be message-based components. In addition, the Bus component 808 and the Controller component 810 may be connected by a message-based connection 816. Exemplary embodiments may allow one or more messages to be sent by the Bus component 808 and received by the Controller component 810 during execution of the model 800 when the Bus component 808 is connected to the Controller component 810 using a message-based connection. In addition, the Controller component 810 may generate and send one or more reply messages to the Bus component 808.

Suppose a user is interested in examining and verifying the actual messages exchanged between the Bus component 808 and the Controller component 810 across the message-based connection 816 during execution of the model 800. In this case, the user may access an Observer component, such as Observer component or block 820.

Figure 9A:
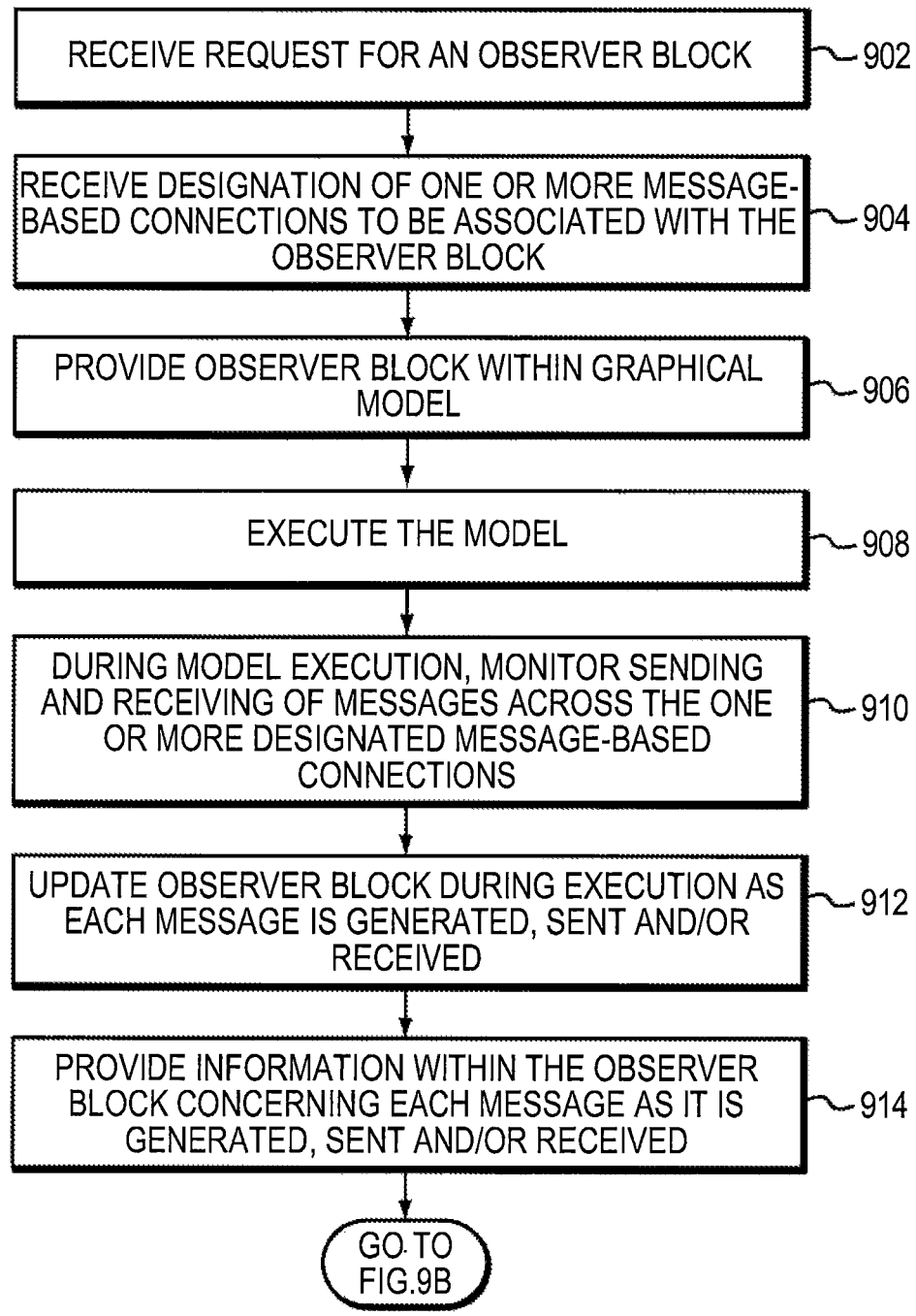
FIGS. 9A and B are partial views of a flow diagram of exemplary processing that can be used in accordance with an embodiment of the disclosure.

FIGS. 9A and B are a flow diagram illustrating exemplary processing in accordance with an embodiment of the disclosure.

The verification engine 218 may receive a request for an Observer block, as indicated at block 902. The verification engine 218 may also receive a designation of one or more message-based connections to which the requested Observer block is to be associated, as indicated at block 904. In response to the request, the verification engine 218 may cooperate with the constructor 224 to create an Observer component, such as an object instance. In addition, the model builder 210 may present a corresponding Observer block, such as block 820, in the graphical model 800, as indicated at block 906. A user may issue a request for an Observer block either textually, e.g., by entering a command in a Command Line Interface (CLI), or graphically, e.g., by selecting an Observer block from a library browser. In an embodiment, a user may select a message-based connection of interest, for example, connection 816, such as with the mouse 118. In response, the verification engine 218 may present one or more selectable commands in a drop-down list, including an 'Insert Observer Block' command. The user may select the 'Insert Observer Block' command, thereby causing an Observer component to be created that is associated with the selected message-based connection.

In an embodiment, the Observer block 820 may include a plurality of Graphical User Interface (GUI) elements. Specifically, the Observer block 820 may include corresponding icons for the two or more message-based participants, e.g., the components connected by the message-based connection to which the Observer block is associated. Here, the Observer block 820 may include a first box element 822 representing the Bus component 808, and a second box element 824 representing the Controller component 810. The Observer block 820 may also include a line element, such as line elements 826, 828 extending from each box element 822, 824. Information concerning messages exchanged between the Bus component 808 and the Controller component 810 across message-based connector 816 may be presented between the line elements 826, 828 of the Observer block 820.

After issuing a request for an Observer block and associating it with a message-based connection of interest, the model may be executed, as indicated at block 908. As part of the execution of the model 800, the Bus component 808 may generate and send one or more messages to the Controller component 810, and the Controller component 810 may respond with one or more reply messages. Information concerning this exchange of messages may be presented by the Observer block 820.

Specifically, the verification engine 218 may monitor the sending and receiving of messages across the selected message-based connector 816, as indicated at block 910. For example, the verification engine 218 may interface with the message-based execution engine 216. In addition, as each such message is generated and sent, the verification engine 218 may add an entry to the Observer block for that message, as indicated at block 912. The verification engine 218 may also include within each entry one or more information elements concerning the respective message, as indicated at block 914. For example, the verification engine 218 may add an arrow element to the Observer block 820 for each actual message. An arrow pointing from line element 828, which extends from box element 822, to line element 830, which extends from box element 824, may represent a message sent from the Bus component 808 to the Controller component 810. An arrow pointing from line element 830 to line element 828 may represent a reply message sent from the Controller component 810 to the Bus component 808. The verification engine 218 may also include a data element at each entry that indicates the type of message sent, and that includes information from the message's payload. The entire payload or a portion thereof may be included in the entry's data element.

In addition, the verification engine 218 may include one or more time elements in the entry for a given message. The one or more time elements may contain information relating to the timing characteristics of the message. In particular, a message may be sent by a source component at a particular time, which may be denoted as the TimeSent, $T_S$, and may be received by a destination component at a particular time, which may be denoted as TimeReceived, $T_R$. One or more of these timing characteristics, such as $T_S$ and/or $T_R$, may be included in the entry of the Observer block 820 by the verification engine 218.

The timing characteristics of a message may be determined by the verification engine 218 in cooperation with the message-based execution engine 216. For example, system 202 may receive a clock signal from system clock 212, and the message-based execution engine 216 may use this clock signal to identify one or more timing characteristics of messages.

As illustrated in the Observer block 820, four messages were generated and sent across the message-based connection 816 during execution of the model 800, as indicated by arrow elements 830-833. All four messages were sent by the Bus component 808 to the Controller component 810 as indicated by the arrow elements 830-833. Furthermore, each of the four messages may be 'Altitude' type messages, and may carry the following payloads: '10,000', '20,000', '30,000, and '40,000'. In addition, the four messages were received by the Controller component 810 at the following times: 12 s, 18 s, 20 s, and 21.4 s, as indicated by timing elements 834-837 of the Observer block 820.

Figure 9B:
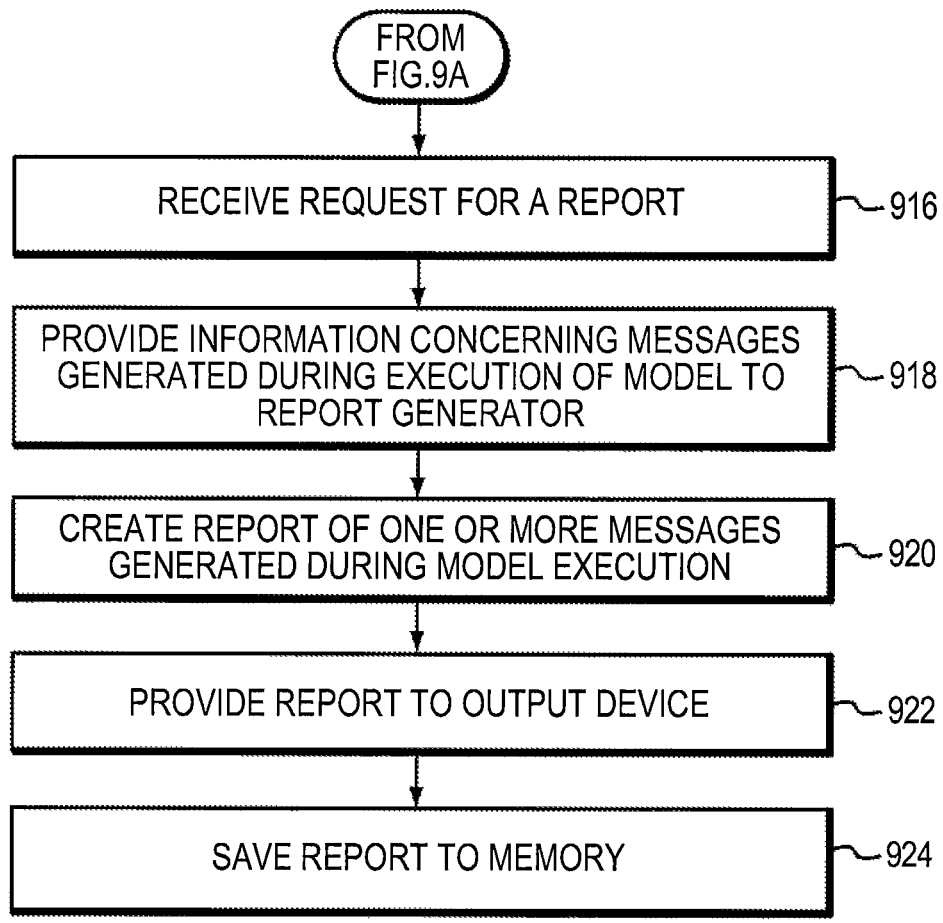

The verification engine 218 may also receive a request for a report of the messaging information presented by the Observer block 820, as indicated at block 916 (FIG. 9B). For example, a user may request such a report. The verification engine 218 may provide the information to the report generator 220, as indicated at block 918, and the report generator 220 may create a report, as indicated at block 920. The report generator 220 may provide the report to an output device, such as the display 120, a printer, etc., as indicated at block 922. The report generator 220 may also or alternatively save the report in memory, as indicated at block 924.

The Observer block 820 may be docked, that is fixed, to the model 800. The Observer block 820 also may be visually associated with the message-based connection 816 through a line element (not shown) connecting the Observer block 820 to the connection 816. Alternatively, the Observer block 820 may be a floating block. A floating block is not locked to any particular location in the model 800, but may be moved around the canvas, for example, by the user. In this case, an icon, such as a glasses element 840, may be placed near the connection 816 to indicate that an Observer block is associated with this message-based connection.

In an embodiment, the high-level modeling environment 200 may include one or more code generation modules for generating code from a model, such as C code, C++ code, Hardware Description Language (HDL) code, etc. The code generation module may generate code for one or more verification blocks, such as the Scenario blocks. If the code for the Scenario block detects an invalid trace, for example, it may generate an error message that could be read by another code module, which in turn may take some predetermined action, such as resetting the deployed systems, or sending a signal to a processing unit.

The generated code, moreover, may be used in a deployed system, that may be a real-world system that is physically separate from the data processing system 100 on which the high-level modeling environment 200 operates. Exemplary deployed systems include controllers, such as Engine Control Units (ECUs) used in cars and trucks, Anti-lock Braking Systems (ABS), aircraft flight control systems, etc.

Suitable code generation models include the Real Time Workshop code generator and the Simulink HDL Coder products from The MathWorks, Inc.

Referring to FIG. 10, the modeling system 1000 may further include a code generator 1016. The code generator 1016 may be configured to generate code, such as computer programming code, for a model or portion thereof. The generated code may be standalone code that is independently executable, e.g., executable outside of the modeling system 1000, and may be compatible with a specified target platform. Exemplary target platforms include a server or other data processing machine running a Microsoft Windows operating system, a server or data processing machine running a UNIX or Linux operating system, and an embedded system having a microprocessor, a Digital Signal Processor (DSP), a Field Programmable Gate Array (FPGA), and/or an Application Specific Integrated Circuit (ASIC), among others. The generated code may be deployed to and run by the target platform, which may not include a modeling system 1000. During the code generation process, a user may specify the target platform, and may specify other options for the code generation process, such as the use of one more optimizations. The generated code may be source code, object code, an executable, a binary, a hardware description language (HDL) description, etc., and may conform to a programming language, such as C, C++, VHDL, Verilog, etc. In an embodiment, the code generator 1016 may be configured to generate code that, when compiled or interpreted on the target platform, creates a message-passing architecture or service. This message-passing architecture or service may be used by other modules of the generated code representing message-based components or objects of a model.

In another embodiment, the code generator 1016 may generate code that takes advantage of an existing message-passing architecture or service of a target platform. For example, in addition to specifying a particular target platform, a user may indicate a message-passing service already present and available on the target platform. For example, the VxWorks real time operating system (RTOS) from Wind River Systems, Inc. of Alameda, Calif. creates message channels to support fast communication between applications, tasks, and processes. These message channels provide a connection-oriented, bidirectional messaging mechanism based on the Transparent Interprocess Communication (TIPC) open source protocol. The Run-time Environment (RTE) of the Automotive Open System Architecture (AUTOSAR), an open and standardized automotive software architecture jointly developed by various automobile manufacturers, suppliers, and tool developers, also defines an information exchange service. The Portable Operating System Interface for UNIX (POSIX) is a set of IEEE and ISO standards defining an interface between application programs and UNIX type operating systems. PROFINET is an industrial networking standard designed for automation. The code generator 1016 may be configured to generate code that interfaces to the message channels of the VxWorks RTOS, the RTE from AUTOSAR, the POSIX standard, or the PROFINET standard, instead of creating a separate message passing service. For example, an interface specification, such as an Application Programming Interface (API), may provide details for interfacing to a particular message-passing service, such as VxWorks' message channels. The code generator 1016 may be configured to generate code that includes calls to the message-passing service, based on the interface specification.

The code generator 1016 may include or have access to code replacement tables containing message-passing service implementations for one or more existing message-passing services. When the code generate 1016 reaches a point in the generated code regarding the passing of a message, the code generator 1016 may access the one or more code replacement tables for the selected message-passing service, and utilize within the generated code the message-passing service implementations contained in the one or more tables. It should be understood that other techniques may be used to specify an implementation of an existing message-passing service.

Figure 18:
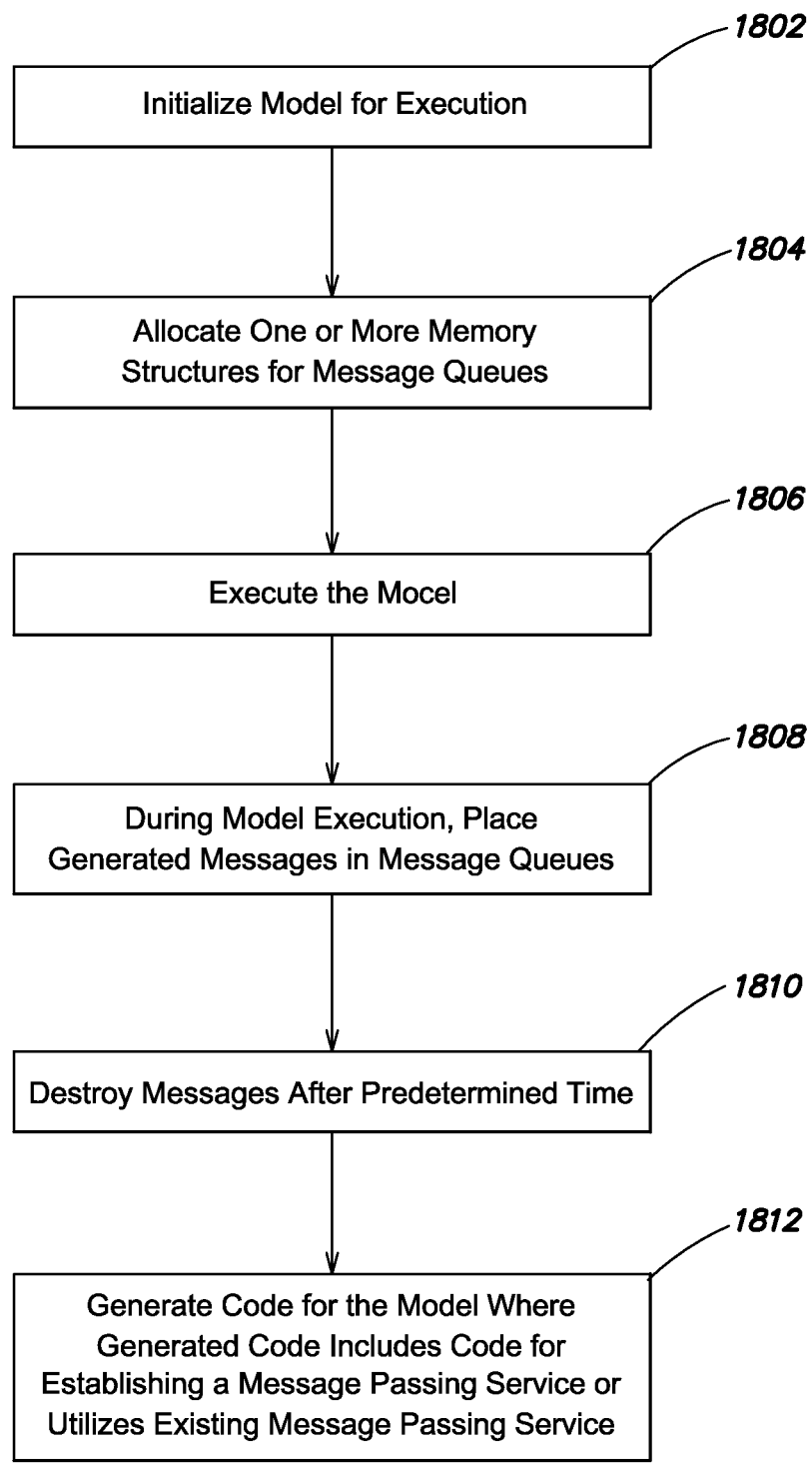
FIG. 18 is a flow diagram of exemplary processing that can be used in accordance with an embodiment of the disclosure.

FIG. 18 is a flow diagram of a method in accordance with an embodiment of the disclosure. The simulation engine 1006 may initialize a model or a portion thereof for execution, as indicated at block 1802. As part of the model initialization process, the simulation engine 1006 may be allocated one or more data structures, e.g., in memory, for establishing the model's message queues, as indicated at block 1804. The simulation engine 1006 in cooperation with the message-based modeling entity 1012 may execute the model or the portion thereof, as indicated at block 1806. During execution, the message-based modeling entity 1012 may place messages generated by producer/sender objects in the message queues 1042, as indicated at block 1808. In addition, the message-based modeling entity 1012 may destroy the generated messages at a predetermined time that may be less than the model's simulation and/or execution time, as indicated at block 1810. In addition, in an embodiment, the code generator 1016 may generate code, such as computer programming code or hardware description language code, for the model or the portion thereof, as indicated at block 1812. The generated code may include code for establishing a message passing service or it may utilize a message passing service of the target platform, as also indicated at block 1812.

An executable graphical model may include portions, such as sub-models, subsystems, blocks, etc., that are configured to execute at different rates relative to each other. The different model rates may be a function of a fundamental rate or a fundamental model sample time.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system (e.g., system 100) or a user of a computer or data processing system, unless otherwise stated.

Further, certain embodiments of the disclosure may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 100. The computer-executable instructions may include instructions that implement one or more embodiments of the disclosure. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. For example, one or more message-based blocks, such as a verification block, may be configured through a command line Application Programming Interface (API) that may be provided by the message-based object constructor or the verification engine. Therefore, it is the object of the appended claims to cover all such variations and modifications as come within the true spirit and scope of the disclosure.

What is claimed is:
1. A method comprising:
    for a computer model including
        a message sender model element,
        a message receiver model element,
        a first time-based model element, and
        a second time-based model element,
    the computer model configured to execute over a model execution time;
    executing, by a processor, the message sender model element and the message receive model element during execution of the computer model, the executing the message sender model element and the message receiving model element including
  generating a message having a payload that remains fixed for a given send-receive interaction, the message persisting for a determined portion of the model execution time;
retrieving the message by the message receiver model element;
processing the payload of the message by the message receiver model element; and
executing, by the processor, the first and second time-based model elements during execution of the computer model.

2. The method of claim 1 further comprising:
storing the message in a message queue, wherein the message queue has a length, a processing order, and an overflow policy, and the message receive model element retrieves the message from the message queue.

3. The method of claim 2 wherein the message or the message queue has a priority.

4. The method of claim 2 wherein the executing the message receiver model element includes:
checking the message queue for the message;
if the message is found in the message queue, removing the message from the message queue; and
processing the message removed from the message queue.

5. The method of claim 2 further comprising:
including within the computer model a graphical element configured to represent the message queue.

6. The method of claim 2 wherein the computer model further includes a signal associated with the first and second time-based model elements, and the executing the first and second time-based model elements includes:
computing a quantity by the first time-based model element,
writing the computed quantity to the signal associated with the first and second model elements, and
reading the computed quantity from the signal by the second time-based model element.

7. The method of claim 1 wherein the executing the message sender model element proceeds without the message sender model element waiting for an acknowledgement from the message receiver model element.

8. The method of claim 1 wherein the executing the message sender model element pauses after generating the message until an acknowledgement is received by the message sender model element from the message receiver model element.

9. The method of claim 1 further comprising:
including within the computer model a graphical element configured to represent a message-based connection between the message sender model element and the message receiver model element.

10. A method comprising:
for a computer model including a message receiver model element and a state-based portion having a first state;
receiving a specification of a message to be generated by the state-based portion of the computer model while in the first state, the message configured
  to include a payload that remains fixed for a given send-receive interaction, and
  to persist for a determined time interval of a model execution time for the computer model; and
executing, by a processor, the computer model over the model execution time, the executing including
  generating, during execution of the computer model, the message while the state-based portion is in the first state,
  receiving the message at the message receiver model element,
  processing the message by the message receiver model element, and
  destroying the message after the determined time interval of the model execution time.

11. The method of claim 10 wherein
the state-based portion includes a second state, and
the message is received and processed by the second state of the state-based portion.

12. The method of claim 10 wherein the specification of the message is defined textually, graphically, or a combination of textually and graphically.

13. The method of claim 10 wherein the processing the message includes evaluating the payload of the message by the message receiver model element.

14. The method of claim 10 wherein
the specification of the message to be generated by the state-based portion of the computer model is included in one or more action statements associated with the first state.

15. The method of claim 14 wherein the one or more action statements correspond to
an entry type of action,
a during type of action,
an exit type of action, or
an on event type of action.

16. A method comprising:
for a computer model including
  a message sender model element and
  a state-based portion that includes a first state, a second state, and a transition between the first state and the second state;
receiving a specification of a message to guard the transition between the first state and the second state; and
executing, by a processor, the computer model over a model execution time, the executing including
  generating a given message by the message sender object, the given message having a payload that remains fixed for a send-receive interaction, and configured to persist for a determined time interval of the model execution time,
  determining whether the given message generated by the message sender model element satisfies the specification of the message that guards the transition between the first state and the second state,
  transitioning the state-based portion from the first state to the second state when the given message generated by the message sender model element is determined to satisfy the specification of the message, and
  destroying the message after the determined time interval of the model execution time.

17. The method of claim 16 wherein the determining includes evaluating the payload of the message generated by the message sender model element.

18. The method of claim 16 wherein the specification of the message indicates
any message,
a particular message, or
a condition.

19. The method of claim 16 wherein the specification of the message conforms to a programming syntax.

20. A method comprising:
for a computer model configured to execute over a model execution time, the computer model including a message sender model element and a message receiver model element, where the message sender model element is configured to
generate, during execution of the computer model, a message having a payload that remains fixed for a send-receive interaction, the message persisting for a determined time interval of the model execution time, and
send the message to the message receiver model element, and
the message receiver model element is configured to
receive the message, and
process the payload of the message;
generating by a processor, code for the computer model, the code
executable by a target platform, and
including either
first code for establishing a message passing service on the target platform to support the sending of the message by the message sending model element and the receiving of the message by the message receiver model element, or
second code for interfacing to an existing message passing service provided on the target platform; and
storing the generated code generated for the computer model in the first or a second memory.

21. The method of claim 20 wherein the generated code is computer source code, computer object code, or a hardware description language (HDL) description of the computer model.

22. The method of claim 20 further comprising:
executing the generated code at the target platform.

23. The method of claim 20 further comprising:
receiving an indication whether to include the first code or the second code in the generated code.

24. One or more non-transitory computer-readable media comprising program instructions, the program instructions when executed by one or more processors operable to:
store, in a memory, a computer model having a message receiver model element and a state-based portion having a first state;
receive a specification of a message to be generated by the state-based portion of the computer model while in the first state, the message configured
to include a payload that remains fixed for a given send-receive interaction, and
to persist for a determined time interval of a model execution time for the computer model; and
execute the computer model over the model execution time, the executing including
generating, during execution of the computer model, the message while the state-based portion is in the first state,
receiving the message at the message receiver model element,
processing the message by the message receiver model element, and
destroying the message after the determined time interval of the model execution time.

25. The one or more non-transitory computer-readable media of claim 24 wherein
the state-based portion includes a second state, and
the message is received and processed by the second state of the state-based portion.

26. The one or more non-transitory computer-readable media of claim 24 wherein the specification of the message is defined textually, graphically, or a combination of textually and graphically.

27. One or more non-transitory computer-readable media comprising program instructions, the program instructions when executed by one or more processors operable to:
store, in a memory, a computer model having
a message sender model element and
a state-based portion that includes a first state, a second state, and a transition between the first state and the second state;
receive an indication of a message to guard the transition between the first state and the second state; and
execute the computer model over a model execution time, the executing including
generating a given message by the message sender object, the given message having a payload that remains fixed for a send-receive interaction, and configured to persist for a determined time interval of the model execution time,
determining whether the given message generated by the message sender model element satisfies the specification of the message that guards the transition between the first state and the second state, and
transitioning the state-based portion from the first state to the second state when the given message generated by the message sender model element is determined to satisfy the specification of the message.

28. The one or more non-transitory computer-readable media of claim 27 wherein the determining includes evaluating the payload of the message generated by the message sender model element.

29. One or more non-transitory computer-readable media comprising program instructions, the program instructions when executed by one or more processors operable to:
access, from a first memory, a computer model configured to execute over a model execution time, the computer model having a message sender model element and a message receiver model element, where the message sender model element is configured to
generate, during execution of the computer model, a message having a payload that remains fixed for a send-receive interaction, the message persisting for a determined time interval of the model execution time, and
send the message to the message receiver model element, and
the message receiver model element is configured to
receive the message, and
process the payload of the message;
generate code for the computer model, the code
executable by a target platform, and
including either
first code for establishing a message passing service on the target platform to support the sending of the message by the message sending model element and the receiving of the message by the message receiver model element, or
second code for interfacing to an existing message passing service provided on the target platform; and storing the generated code generated for the computer model in the first or a second memory.

30. The one or more non-transitory computer-readable media of claim 29 wherein the generated code is computer source code, computer object code, or a hardware description language (HDL) description of the computer model.

31. The one or more non-transitory computer-readable media of claim 29 further comprising:
receiving an indication whether to include the first code or the second code in the generated code.

* * * * *

UNITED STATES PATENT AND TRADEMARK OFFICE
CERTIFICATE OF CORRECTION

PATENT NO.        : 9,594,608 B2
APPLICATION NO.   : 14/335159
DATED             : March 14, 2017
INVENTOR(S)       : Hidayet T. Simsek et al.

It is certified that error appears in the above-identified patent and that said Letters Patent is hereby corrected as shown below:

In the Specification

Column 18, Line 3 reads:
include a state chart 2014 labeled 'Printed' that is coupled to Should read:
include a state chart 2014 labeled 'Printer1' that is coupled to Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*